US012069426B1

(12) United States Patent
Zhao et al.

(10) Patent No.: US 12,069,426 B1
(45) Date of Patent: Aug. 20, 2024

(54) AUDIO DEVICES AUGMENTED WITH ACOUSTIC METAMATERIALS

(71) Applicant: META PLATFORMS TECHNOLOGIES, LLC, Menlo Park, CA (US)

(72) Inventors: Chuming Zhao, Redmond, WA (US); Morteza Khaleghimeybodi, Bothell, WA (US); Nils Thomas Fritiof Lunner, Redmond, WA (US); Calvin Bernard Shaw, Milpitas, CA (US); Yun Zhou, Redmond, WA (US); Xiaochu Yao, San Jose, CA (US)

(73) Assignee: META PLATFORMS TECHNOLOGIES, LLC, Menlo Park, CA (US)

( * ) Notice: Subject to any disclaimer, the term of this patent is extended or adjusted under 35 U.S.C. 154(b) by 0 days.

(21) Appl. No.: 17/738,971

(22) Filed: May 6, 2022

Related U.S. Application Data

(60) Provisional application No. 63/188,025, filed on May 13, 2021.

(51) Int. Cl.

| | |
|---|---|
| ***H04R 1/28*** | (2006.01) |
| ***H04R 1/02*** | (2006.01) |
| ***H04R 1/10*** | (2006.01) |

(52) U.S. Cl.
CPC .......... *H04R 1/2826* (2013.01); *H04R 1/028* (2013.01); *H04R 1/1008* (2013.01); *H04R 2499/15* (2013.01)

(58) Field of Classification Search
CPC .... H04R 1/2826; H04R 1/028; H04R 1/1008; H04R 1/1075; H04R 1/2815;
(Continued)

(56) References Cited

U.S. PATENT DOCUMENTS

2021/0264889 A1* 8/2021 Mathur ................ H04R 1/2857
2022/0159370 A1* 5/2022 Shumard .............. H04R 1/2842
(Continued)

FOREIGN PATENT DOCUMENTS

WO WO-2020125940 A1 * 6/2020 ........... H04R 1/2811

OTHER PUBLICATIONS

Wang Y., et al., "A Space-Coiled Acoustic Metamaterial with Tunable Low-Frequency Sound Absorption," Laboratory of Science and Technology on Integrated Logistics Support, Feb. 19, 2018, 5 pages, Retrieved from Internet: URL: https://iopscience.iop.org/article/10.1209/0295-5075/120/54001/meta.

*Primary Examiner* — Ahmad F. Matar
*Assistant Examiner* — Sabrina Diaz
(74) *Attorney, Agent, or Firm* — Weaver Austin Villeneuve & Sampson LLP

(57) ABSTRACT

An audio system includes a speaker having a transducer, where the speaker is positioned within an enclosure that forms a front volume and a rear volume on opposite sides of the transducer. The rear part of the enclosure defining the rear volume is formed of an acoustic metamaterial that defines a plurality of channels within the rear volume, where the number and dimensions of the channels is configured to virtual increase the rear volume to amplify a bass portion of sound produced by the speaker. In addition, the channels may be configured to match an impedance of the front volume to serve as an absorber for high frequency audio.

18 Claims, 14 Drawing Sheets

(58) Field of Classification Search
CPC .. H04R 1/2823; H04R 1/2869; H04R 1/2876; H04R 1/2807; H04R 1/28; H04R 1/2803; H04R 1/2811; H04R 1/2819; H04R 1/2853; H04R 1/2857; H04R 1/2873; H04R 1/2888; H04R 1/2861; H04R 2499/11; H04R 2499/15; H04R 2201/10; H04R 2201/029
USPC ....... 381/334, 332, 333, 345, 337, 353, 354, 381/338, 339, 349
See application file for complete search history.

(56) References Cited

U.S. PATENT DOCUMENTS

| | | | | |
|---|---|---|---|---|
| 2023/0055494 | A1* | 2/2023 | Clark | H04R 1/1058 |
| 2023/0061686 | A1* | 3/2023 | Wolfl | H04R 1/2853 |

* cited by examiner

AUDIO DEVICES AUGMENTED WITH ACOUSTIC METAMATERIALS

CROSS-REFERENCE TO RELATED APPLICATIONS

This application claims the benefit of and priority to U.S. Provisional Application No. 63/188,025, filed May 13, 2021, the entire contents of which are hereby incorporated by reference for all purposes as if fully set forth herein.

FIELD OF THE INVENTION

This disclosure relates generally to audio devices, and more specifically to audio devices augmented with acoustic metamaterials.

BACKGROUND

Conventional audio devices typically are built using naturally occurring materials. These naturally occurring materials have properties that can function as constraints that in part control size, weight, and power of conventional audio devices. In addition, when designing audio modules having a small form factor, space is an important constraint. However, limited space may introduce high stiffness, potentially lowering speaker output, and may also introduce unwanted resonances.

SUMMARY

In accordance with some embodiments, an audio system includes a transducer configured to emit sound, and an enclosure containing the transducer and forming a front volume and a rear volume on opposite sides of the transducer. In some embodiments, the enclosure includes an output port configured to output audio from the front volume that is generated by the transducer, and a plurality of channels formed within the rear volume. The plurality of channels together form an acoustic metamaterial configured to virtually increase the rear volume, to amplify a bass portion of the sound to form audio content that is presented to a user.

In some embodiments, the plurality of channels virtually increase the rear volume, such that an equivalent acoustic volume (Vas) of the audio system is greater than the volume of the front and rear volumes.

In some embodiments, the plurality of channels comprise channels of a plurality of different depths. The depths of the channels may be selected to attenuate one or more selected resonance frequencies. For example, the depths of one or more channels may be selected such that the channels function as quarter wave resonators for frequencies of the one or more selected resonance frequencies. In some embodiments, the plurality of channels have dimensions selected to match an impedance of the front volume.

In some embodiments, the plurality of channels include one or more straight channels that extend in a direction orthogonal to a surface area of the transducer. In some embodiments, the plurality of channels include one or more channels having at least one bend. In some embodiments, the plurality of channels include one or more channels coiled around the transducer. In some embodiments, the plurality of channels are formed within a frame of a headset.

Figure 1A:
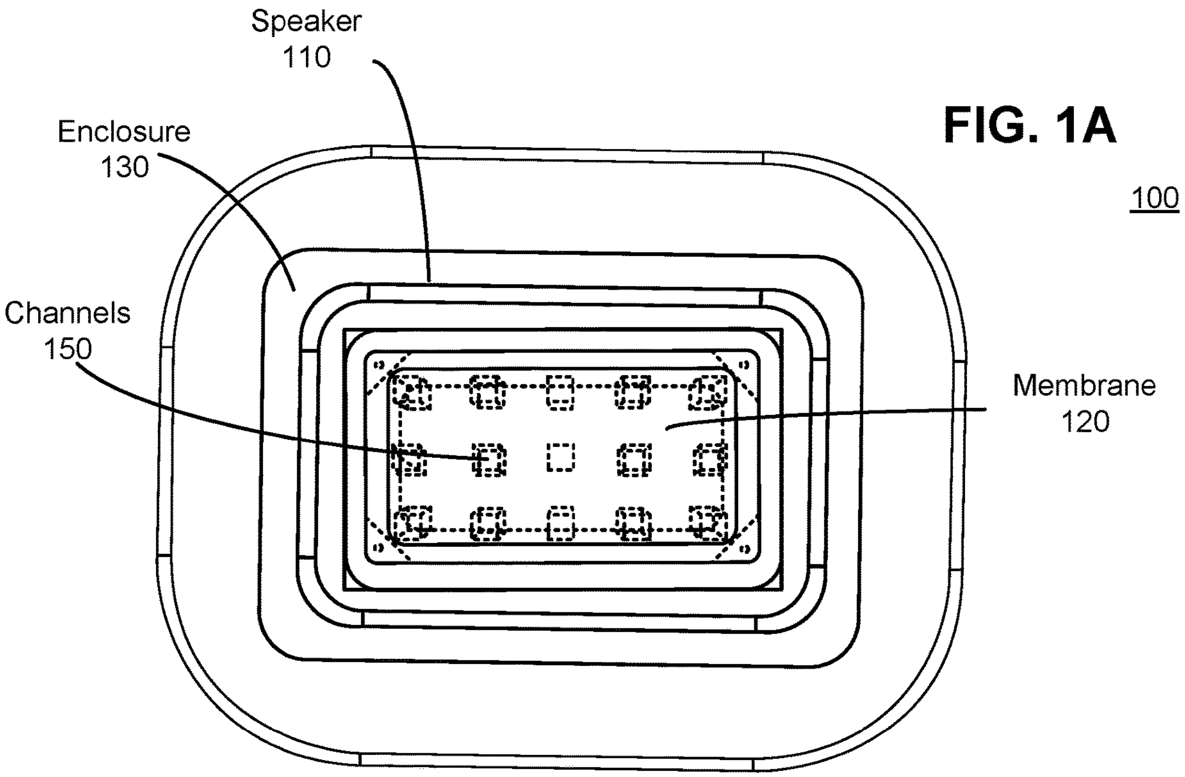
FIGS. 1A, 1, and 1C illustrate a head-on view, an isometric view, and a cross-sectional side view of an audio assembly containing acoustic metamaterials, in accordance with some embodiments.

The FIGURES depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

An audio system is provided that includes one or more audio assemblies and an audio controller (e.g., controls audio content output by the audio system). The one or more audio assemblies include a speaker, which may be integrated into an artificial reality system.

The audio assembly includes at least some of a speaker enclosure, also referred to herein as an "enclosure." In some embodiments, at least a portion of the enclosure is part of a device (e.g., a personal audio device) the audio assembly couples to. A personal audio device is a device worn and/or carried by a user that includes the audio system, and is configured to present audio to a user via the audio system. A personal audio device may be, e.g., a headset, a cell phone, a table, some other device configured to present audio to a user via the audio system, or some combination thereof. In other embodiments the audio assembly includes all of the enclosure, and the whole enclosure couples to a device (e.g., a headset). For example, in some embodiments, the audio assembly may be integrated or coupled into a portion of a frame of a headset, e.g., integrated into a leg portion of the frame. In some embodiments, the enclosure is integrated into a temple portion of a leg portion of the frame, the temple portion corresponding to a temple region on a user's head. The audio assembly has a small form factor (e.g. having a physical volume less than 5 cubic centimeters) and weight (e.g., less than 2 grams), which may result in a more comfortable experience for the user of the headset with the audio assembly integrated into the temple portion of the frame, without sacrificing audio quality and/or audio volume.

In some embodiments, the enclosure of the speaker may contain acoustic metamaterials. Acoustic metamaterials can manipulate and control soundwaves in ways that are not possible using conventional materials. In some embodiments, this sound wave control is achieved by manipulating the transmission medium parameters such as bulk modulus, density, chirality, etc. Density and bulk modulus are both parameters of the acoustic refractive index, which manipulating them can result in changes in the speed of sound in that medium. In some embodiments, this can be achieved by designing a series of sub-wavelength structures to parametrically tune these parameters, thus achieving a more efficient way to deliver high quality sound to the ear. As such, as used herein, acoustic metamaterials may refer to synthetic composite materials serving as a transmission medium for sound emitted by a speaker, a material shaped into physical structures configured to tune emitted sound in a desired manner, and/or a combination thereof.

Various embodiments of audio devices that are augmented with acoustic metamaterials are described herein. The audio devices may be wearable devices. A wearable device may be, e.g., a headset (e.g., as described below with regard to FIG. 2A), head-mounted display, in-ear devices, headphones, communication systems, watch, etc.

Embodiments discussed herein include several ways to use the audio metamaterial to enhance the quality (e.g., frequency bandwidth, sound clarity, loudness) of audio devices. In some embodiments, audio metamaterials are used to virtually enhance a back-volume for a tight back-volume monopole closed-box speaker. This can increase the audio bandwidth, especially to increase the bass performance. In other embodiments, audio metamaterials may be used as an absorption material to attenuate unwanted high-frequency resonances. In other embodiments, audio metamaterials may include straight or meandering tubes configured to alter the effective air density and sound speed within the structure.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to create content in an artificial reality and/or are otherwise used in an artificial reality. The artificial reality system that provides the artificial reality content may be implemented on various platforms, including a wearable device (e.g., headset) connected to a host computer system, a standalone wearable device (e.g., headset), a mobile device or computing system, or any other hardware platform capable of providing artificial reality content to one or more viewers.

Audio Assembly

Figure 1B:
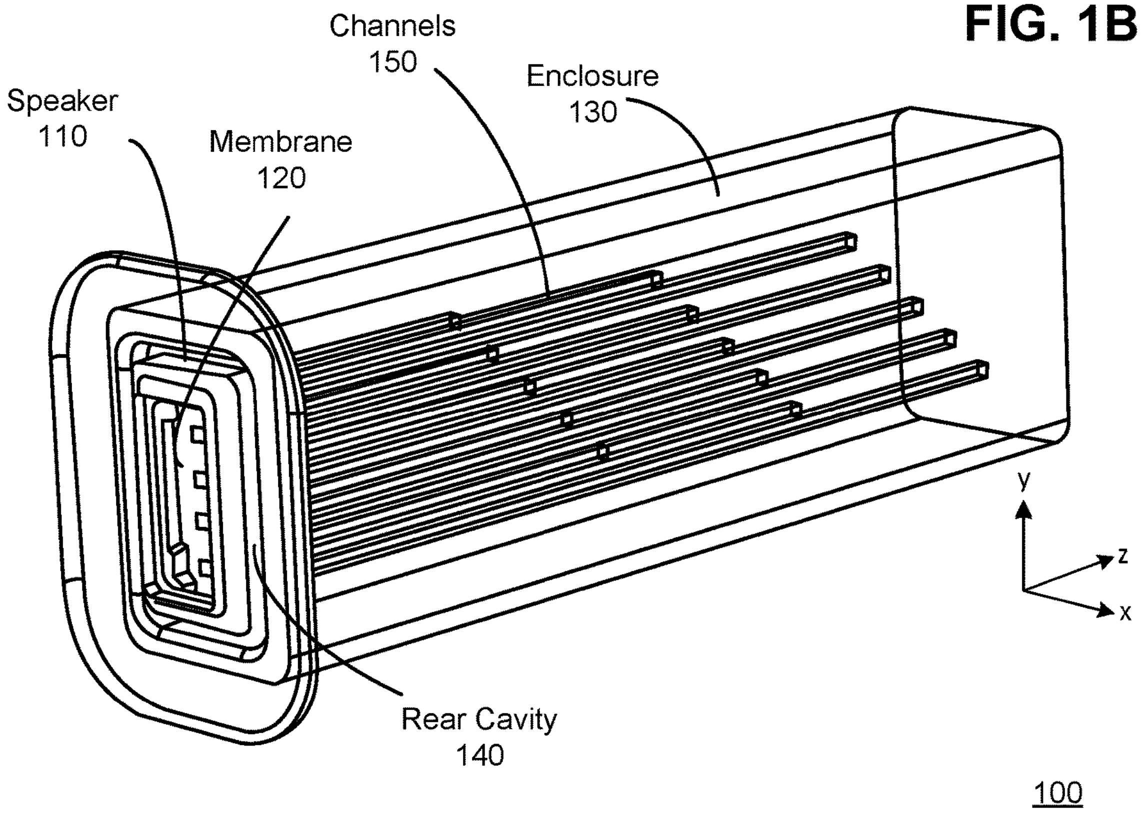
Figure 1C:
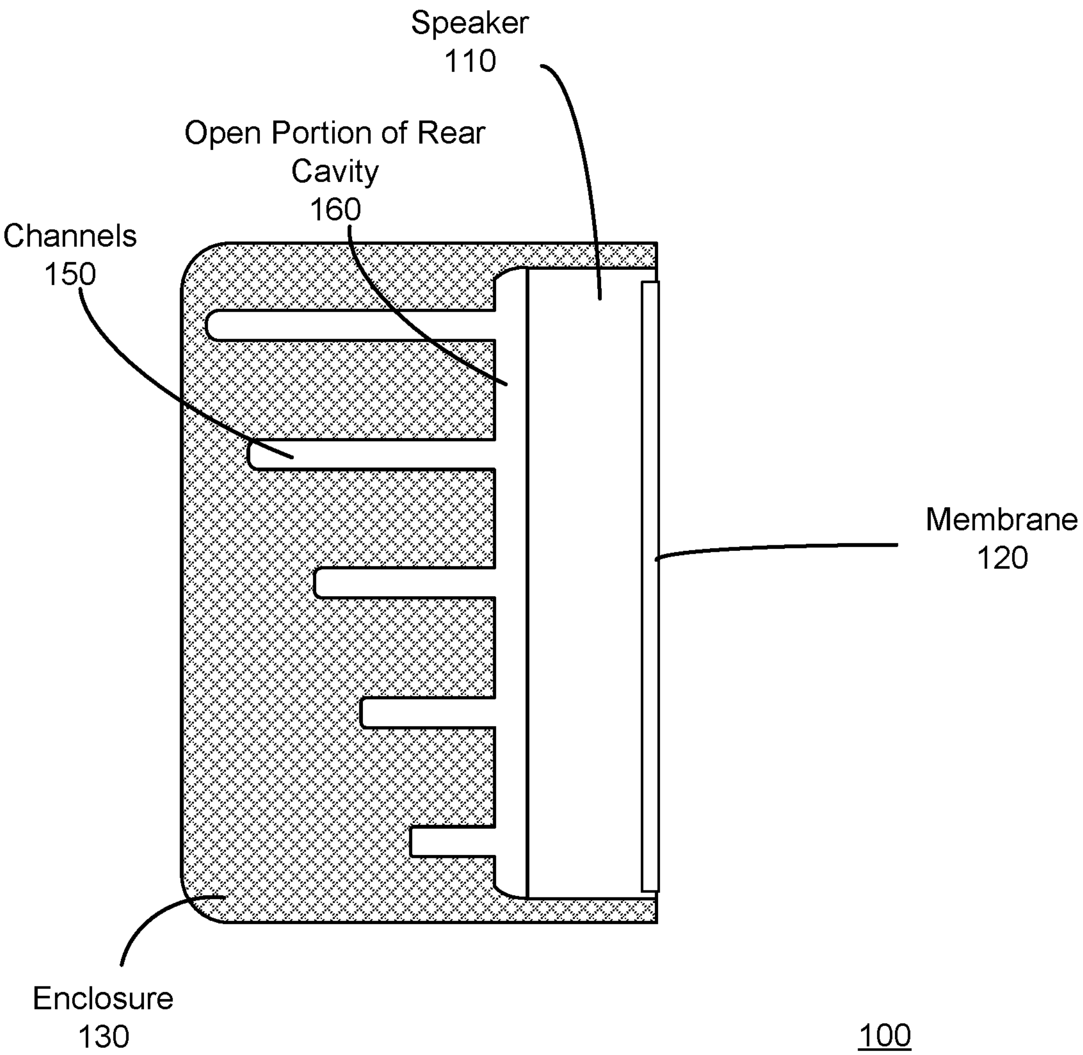
Figure 2:
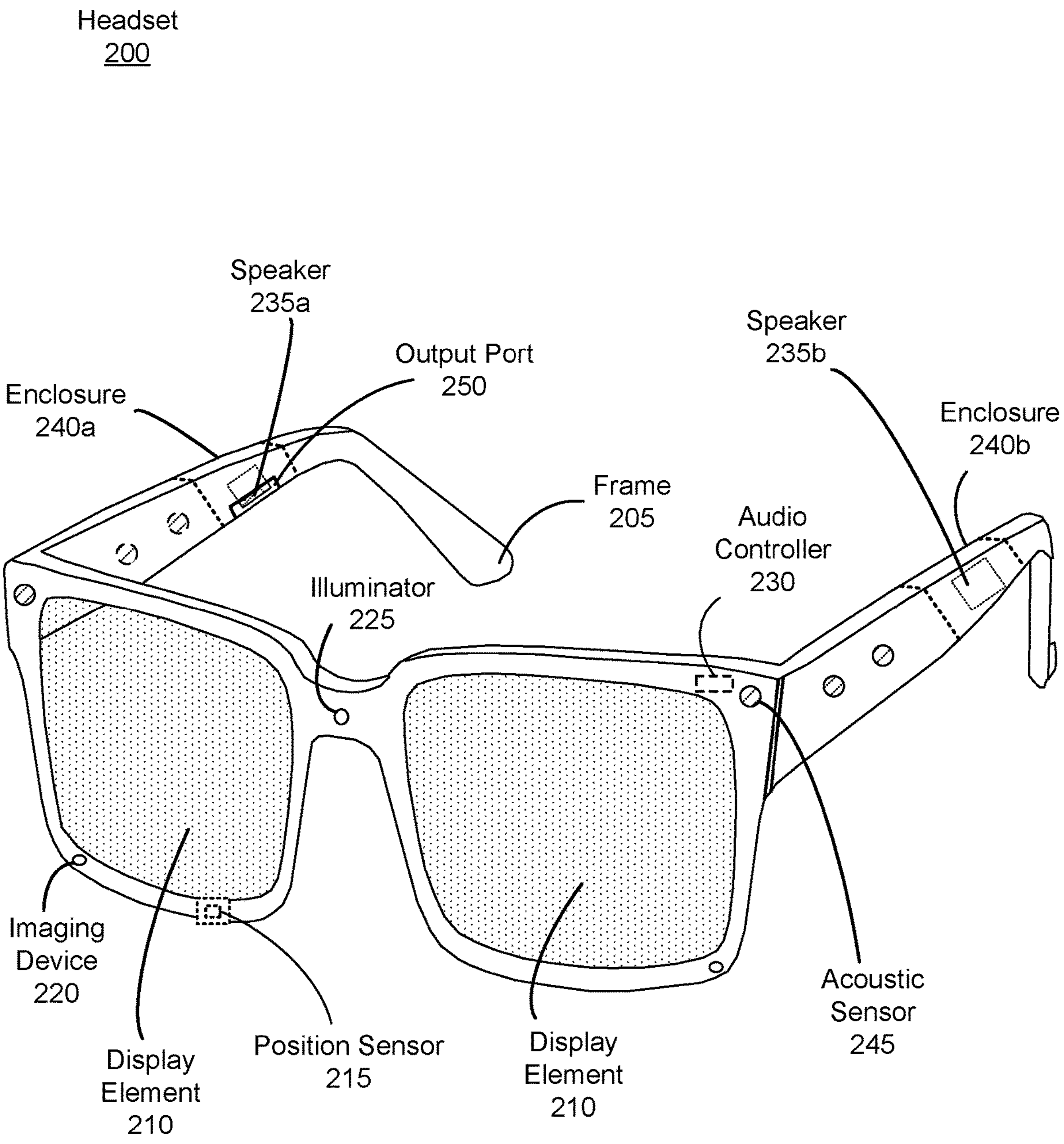
FIG. 2 is a perspective view of a headset implemented as an eyewear device, in accordance with one or more embodiments.

FIGS. 1A, 1B, and 1C illustrate a head-on view, an isometric view, and a cross-sectional side view of an example audio assembly containing acoustic metamaterials, in accordance with some embodiments. The audio assembly 100 includes a speaker 110 having a transducer in the form of a membrane 120, and an enclosure 130. In some embodiments, such as that illustrated in FIGS. 1A-1C, the speaker 110 has a rectangular shape, corresponding to a rectangular prism, and the membrane 120 has a surface with an approximately rectangular shape or a rectangle with rounded corners. In other embodiments, the speaker 110 may have other shapes, e.g., a shape corresponding to an ellipse, such as an elliptical prism. In some embodiments, the shape of the speaker 110 is selected to match design requirements for various applications of the audio system. For example, in some embodiments, the speaker 110 may be used in a temple region of a leg of a headset (e.g., eyeglass form factor), as shown in FIG. 2, where a rectangular shape may be desired for the speaker 110, to conform to the shape of the temple region. In some embodiments, the speaker 110 may have a different overall shape from the membrane 120. For example, the speaker 110 may have a rectangular shape, while the membrane 120 has an elliptical shape.

Additionally, the speaker 110 may have a small size suitable for various design requirements, such as for integration with a headset. In some embodiments, the speaker 110 is a speaker with a total area of the membrane 120 being less than 200 square millimeters.

The speaker 110 includes components not shown in FIGS. 1A and 1B, such as electrical circuit elements, according to some embodiments. In response to receiving an electrical audio signal, the speaker 110 actuates the membrane 120, generating an acoustic wave (i.e. the emitted sound) corresponding to the received electrical audio signal. The actuated membrane may be displaced, in response to the electrical audio signal, based upon a mechanical compliance (Cms) of the membrane, e.g., a high Cms membrane (e.g., a membrane having a Cms greater than 10 mm/N) has a greater displacement and acoustic sensitivity of the membrane than a low Cms membrane.

In some embodiments, a resonant frequency of the speaker 110 may be based upon a Cms of the membrane 120, e.g., a speaker 110 having a high Cms membrane 120 with low stiffness may have a lower resonant frequency, relative to speakers of the same size having a lower Cms membrane, according to some embodiments. Lower resonant frequencies enable the audio system to have a larger bandwidth and improved performance at low frequencies, than audio systems with higher resonant frequencies. In some embodiments, the speaker 110, which may be designed for use in consumer electronics or wearables, has a resonant frequency ranging between 50 Hz to 2000 Hz.

The enclosure 130 forms a cavity 140 (also referred to as a rear cavity, rear volume, or back volume) behind the speaker 110. In conventional speakers, the cavity may be in the form of a sealed box (e.g., a closed cavity) or a vented box (e.g., a cavity with one or more open rear ports) sized to achieve a desired sound pressure level (SPL) for the speaker 110. In some embodiments, the cavity is formed into a plurality of long, narrow channels 150, in order to achieve improved bass performance in comparison to a speaker with rear cavity formed as a sealed box with the same total volume, or similar acoustic performance (e.g., same SPL) with a smaller volume, by virtually increasing the volume of the rear cavity. As used herein, "virtually" increasing the volume of the rear cavity may refer to shaping the rear cavity (e.g., by forming the rear cavity to include the plurality of channels) to modify the acoustic properties of the rear cavity to be equivalent to that of a conventional sealed box rear cavity having a larger volume than the actual volume of the rear cavity, e.g., such that an equivalent acoustic volume (Vas) of the rear cavity may exceed that of the actual volume of the rear cavity by ~30% in a small form factor microspeaker. This may be advantageous for audio systems used in headsets, where the audio assembly may need to fit in a relatively small space. Thus, the audio assemblies may satisfy the design requirements for a variety of headset configurations without sacrificing audio performance and/or audio volume. In comparison to other audio systems of comparable size and weight, the audio system may generate sounds at a higher sound volume with the same or less electrical power input, according to some embodiments. For instance, using the same electrical power input, the audio system may generate sounds at a higher sound volume than a comparably sized audio system that does not include acoustic metamaterial where the rear cavity is formed into a plurality of channels, according to some embodiments.

In some embodiments, such as that illustrated in FIGS. 1A-1C, the plurality of channels may be implemented as straight tubes. However, in other embodiments, the plurality of channels may contain one or bends, or include curves. For example, in some embodiments, the plurality of channels may be implemented as a plurality of coiled tubes. In some embodiments, the plurality of channels coil around a periphery of the membrane and/or to form a coil along a plane parallel to a plane defined by the membrane (e.g., (e.g., x-y plane as shown in FIG. 1), potentially increasing a footprint of the audio assembly along the plane defined by the membrane, while reducing the dimensions of the audio assembly in a direction orthogonal to the membrane (e.g., along the z-axis). In some embodiments, the plurality of channels are wound in a manner that allows the audio assembly to achieve a form factor compatible with a headset or frame on which the audio assembly is mounted.

In some embodiments, as illustrated in FIG. 1C, the cavity 140 may include an open portion 160 connecting the plurality of channels 150. In some embodiments, open portion 160 is sized to be able to accommodate a maximum displacement of the membrane 120.

In some embodiments, the enclosure 130 may further form a front cavity (or front volume, not shown in FIGS. 1A-1C) on an opposite side of the membrane 120 from the rear cavity 140. The front cavity may be configured to guide sound emitted by the speaker 110 to an output port. In some embodiments, the front cavity may include a waveguide or horn configured to guide the sound to the output port. In some embodiments, the plurality of channels may virtually increase the rear volume such that the Vas of the rear cavity exceeds that of the front cavity and the rear cavity.

Headset

As discussed above, in some embodiments, the audio assembly 100 may be implemented as part of a headset, e.g., integrated into a temple portion of an eyewear device. FIG. 2 is a perspective view of a headset 200 implemented as an eyewear device, in accordance with one or more embodiments. In some embodiments, the eyewear device is a near eye display (NED). In general, the headset 200 may be worn on the face of a user such that content (e.g., media content) is presented using a display assembly and/or an audio system. However, the headset 200 may also be used such that media content is presented to a user in a different manner. Examples of media content presented by the headset 200 include one or more images, video, audio, or some combination thereof. The headset 200 includes a frame, and may include, among other components, a display assembly including one or more display elements 210, a depth camera assembly (DCA), an audio system, and a position sensor 215. While FIG. 2 illustrates the components of the headset 200 in example locations on the headset 200, the components may be located elsewhere on the headset 200, on a peripheral device paired with the headset 200, or some combination thereof. Similarly, there may be more or fewer components on the headset 200 than what is shown in FIG. 2.

The frame 205 holds the other components of the headset 200. The frame 205 includes a front part that holds the one or more display elements 210 and end pieces (e.g., temples) to attach to a head of the user. The front part of the frame 205 bridges the top of the nose of the user. The length of the end pieces may be adjustable (e.g., adjustable temple length) to fit different users. The end pieces may also include a portion that curls behind the ear of the user (e.g., temple tip, ear piece). The end piece may also be referred to herein as a "leg portion of the frame."

The one or more display elements 210 provide light to a user wearing the headset 200. As illustrated the headset includes a display element 210 for each eye of a user. In some embodiments, a display element 210 generates image light that is provided to an eyebox of the headset 200. The eyebox is a location in space that an eye of the user occupies while wearing the headset 200. For example, a display element 210 may be a waveguide display. A waveguide display includes a light source (e.g., a two-dimensional source, one or more line sources, one or more point sources, etc.) and one or more waveguides. Light from the light source is in-coupled into the one or more waveguides which outputs the light in a manner such that there is pupil replication in an eyebox of the headset 200. In-coupling and/or outcoupling of light from the one or more waveguides may be done using one or more diffraction gratings. In some embodiments, the waveguide display includes a scanning element (e.g., waveguide, mirror, etc.) that scans light from the light source as it is in-coupled into the one or more waveguides. Note that in some embodiments, one or both of the display elements 210 are opaque and do not transmit light from a local area around the headset 200. The local area is the area surrounding the headset 200. For example, the local area may be a room that a user wearing the headset 200 is inside, or the user wearing the headset 200 may be outside and the local area is an outside area. In this context, the headset 200 generates VR content. Alternatively, in some embodiments, one or both of the display elements 210 are at least partially transparent, such that light from the local area may be combined with light from the one or more display elements to produce AR and/or MR content.

In some embodiments, a display element 210 does not generate image light, and instead is a lens that transmits light from the local area to the eyebox. For example, one or both of the display elements 210 may be a lens without correction (non-prescription) or a prescription lens (e.g., single vision, bifocal and trifocal, or progressive) to help correct for defects in a user's eyesight. In some embodiments, the display element 210 may be polarized and/or tinted to protect the user's eyes from the sun.

Note that in some embodiments, the display element 210 may include an additional optics block (not shown). The optics block may include one or more optical elements (e.g., lens, Fresnel lens, etc.) that direct light from the display element 210 to the eyebox. The optics block may, e.g., correct for aberrations in some or all of the image content, magnify some or all of the image, or some combination thereof.

The DCA determines depth information for a portion of a local area surrounding the headset 200. The DCA includes one or more imaging devices 220 and a DCA controller (not shown in FIG. 2), and may also include an illuminator 225. In some embodiments, the illuminator 225 illuminates a portion of the local area with light. The light may be, e.g., structured light (e.g., dot pattern, bars, etc.) in the infrared (IR), IR flash for time-of-flight, etc. In some embodiments, the one or more imaging devices 220 capture images of the portion of the local area that include the light from the illuminator 225. As illustrated, FIG. 2 shows a single illuminator 225 and two imaging devices 220. In alternate embodiments, there is no illuminator 225 and at least two imaging devices 220.

The DCA controller computes depth information for the portion of the local area using the captured images and one or more depth determination techniques. The depth determination technique may be, e.g., direct time-of-flight (ToF) depth sensing, indirect ToF depth sensing, structured light, passive stereo analysis, active stereo analysis (uses texture added to the scene by light from the illuminator 225), some other technique to determine depth of a scene, or some combination thereof.

The DCA may include an eye tracking unit that determines eye tracking information. In other embodiments, the eye tracking unit is separate from the DCA. The eye tracking information may comprise information about a position and an orientation of one or both eyes (within their respective eye-boxes). The eye tracking unit may include one or more cameras. The eye tracking unit estimates an angular orientation of one or both eyes based on images captures of one or both eyes by the one or more cameras. In some embodiments, the eye tracking unit may also include one or more illuminators that illuminate one or both eyes with an illumination pattern (e.g., structured light, glints, etc.). The eye tracking unit may use the illumination pattern in the captured images to determine the eye tracking information. The headset 200 may prompt the user to opt in to allow operation of the eye tracking unit. For example, by opting in the headset 200 may detect, store, images of the user's any or eye tracking information of the user.

The audio system provides audio content. The audio system includes a sensor array, a speaker array, and an audio controller 230. However, in other embodiments, the audio system may include different and/or additional components. Similarly, in some cases, functionality described with reference to the components of the audio system can be distributed among the components in a different manner than is described here. For example, some or all of the functions of the controller may be performed by a remote server.

The speaker array presents sound to the user. The speaker array includes one or more audio assemblies. As shown in FIG. 2, the audio system of the headset 200 includes two audio assemblies, with one audio assembly corresponding to the left ear of the user and another audio assembly corresponding to the right ear of the user. Each audio assembly includes a speaker and at least a portion of an enclosure. For example, as shown in FIG. 2, the audio system of the headset 200 includes an audio assembly coupled to a right side of the frame 205, including the speaker **235*a* and a portion of the enclosure 240*a*, corresponding to the right ear of the user and another audio assembly coupled to a left side of the frame 205, including the speaker 235*b* and a portion of the enclosure 240*b*, corresponding to the left ear of the user. Each of the speakers 235*a* and 235*b* (collectively, speakers 235) is contained in a respective one of the enclosures 240*a* and 240*b* (collectively, the enclosures 240), and may correspond to the speaker 110 and enclosure 130 illustrated in FIGS. 1A-1C, respectively. Although the speakers 235 are shown enclosed in the frame 205, the speakers 235 may be exterior to the frame 205. In some embodiments, instead of individual speakers for each ear, the headset 200 includes a speaker array comprising multiple speakers integrated into the frame 205 to improve directionality of presented audio content. The tissue transducer couples to the head of the user and directly vibrates tissue (e.g., bone or cartilage) of the user to generate sound. The number and/or locations of speakers 235 may be different from what is shown in FIG. 2**.

The sensor array detects sounds within the local area of the headset 200. The sensor array includes a plurality of acoustic sensors 245. An acoustic sensor 245 captures sounds emitted from one or more sound sources in the local area (e.g., a room). Each acoustic sensor is configured to detect sound and convert the detected sound into an electronic format (analog or digital). The acoustic sensors 245 may be acoustic wave sensors, microphones, sound transducers, or similar sensors that are suitable for detecting sounds.

In FIG. 2, each of the enclosures 240 is shown integrated into a temple portion of the frame 205, but an enclosure may be coupled to the frame in a different configuration, according to some embodiments. Each of the enclosures 240 includes an output port 250 coupled to a front cavity of the respective enclosure, configured to output sound produced by the speaker 235 from the front cavity of the enclosure 240. In other embodiments, an enclosure may include more than one output port and/or one or more rear ports (not shown), which may be a resistive port configured to dampen a portion of sound emitted by the speaker 235 from a rear cavity of the enclosure 240, or an open port that does not dampen the second portion of the sound, or a combination thereof. The speakers 235 emits sound, in response to an electronic audio signal received from the controller 230, according to some embodiments. The controller 230 may provide and transmit instructions for the audio system to present audio content to the user.

In some embodiments, each of the output ports 250 faces an interior of the frame 205. As used herein, the interior is a direction facing the head of the user wearing the headset

200, while the exterior is the direction facing away from the head of the user wearing the headset 200.

The audio system may also be included in or integrated with devices other than a headset, according to some embodiments. For example, the audio system may be integrated with a mobile device, or any other application requiring a small, light-weight speaker with relatively efficient audio performance.

The sensor array detects sounds within the local area of the headset 200. The sensor array includes a plurality of acoustic sensors 245. An acoustic sensor 245 captures sounds emitted from one or more sound sources in the local area (e.g., a room). Each acoustic sensor is configured to detect sound and convert the detected sound into an electronic format (analog or digital). The acoustic sensors 245 may be acoustic wave sensors, microphones, sound transducers, or similar sensors that are suitable for detecting sounds.

In some embodiments, one or more acoustic sensors 245 may be placed in an ear canal of each ear (e.g., acting as binaural microphones). In some embodiments, the acoustic sensors 245 may be placed on an exterior surface of the headset 200, placed on an interior surface of the headset 200, separate from the headset 200 (e.g., part of some other device), or some combination thereof. The number and/or locations of acoustic sensors 245 may be different from what is shown in FIG. 2. For example, the number of acoustic detection locations may be increased to increase the amount of audio information collected and the sensitivity and/or accuracy of the information. The acoustic detection locations may be oriented such that the microphone is able to detect sounds in a wide range of directions surrounding the user wearing the headset 200.

The audio controller 230 processes information from the sensor array that describes sounds detected by the sensor array. The audio controller 230 may comprise a processor and a computer-readable storage medium. The audio controller 230 may be configured to generate direction of arrival (DOA) estimates, generate acoustic transfer functions (e.g., array transfer functions and/or head-related transfer functions), track the location of sound sources, form beams in the direction of sound sources, classify sound sources, generate sound filters for the speakers 235, or some combination thereof.

The position sensor 215 generates one or more measurement signals in response to motion of the headset 200. The position sensor 215 may be located on a portion of the frame 205 of the headset 200. The position sensor 215 may include an inertial measurement unit (IMU). Examples of position sensor 215 include: one or more accelerometers, one or more gyroscopes, one or more magnetometers, another suitable type of sensor that detects motion, a type of sensor used for error correction of the IMU, or some combination thereof. The position sensor 215 may be located external to the IMU, internal to the IMU, or some combination thereof.

In some embodiments, the headset 200 may provide for simultaneous localization and mapping (SLAM) for a position of the headset 200 and updating of a model of the local area. For example, the headset 200 may include a passive camera assembly (PCA) that generates color image data. The PCA may include one or more RGB cameras that capture images of some or all of the local area. In some embodiments, some or all of the imaging devices 220 of the DCA may also function as the PCA. The images captured by the PCA and the depth information determined by the DCA may be used to determine parameters of the local area, generate a model of the local area, update a model of the local area, or some combination thereof. Furthermore, the position sensor 215 tracks the position (e.g., location and pose) of the headset 200 within the room. Additional details regarding the components of the headset 200 are discussed below in connection with FIG. 9.

Some embodiments of the headset 200 and audio system have different components than those described here. For example, the enclosure 240 may include a different configuration of ports, for example, with a different number, shape, type, and/or size of ports. The example of the audio system shown in FIG. 2 includes two enclosures 240, each enclosure containing a speaker, corresponding to a left and right ear for presenting stereo sound. In some embodiments the audio system comprises speaker array including a plurality of enclosures 240 (e.g. more than two) coupled to the frame 205 of the headset 200. In this case, each enclosure contains one or more speakers. Similarly, in some cases, functions can be distributed among the components in a different manner than is described here. Additionally, the dimensions or shapes of the components may be different.

Figure 3A:
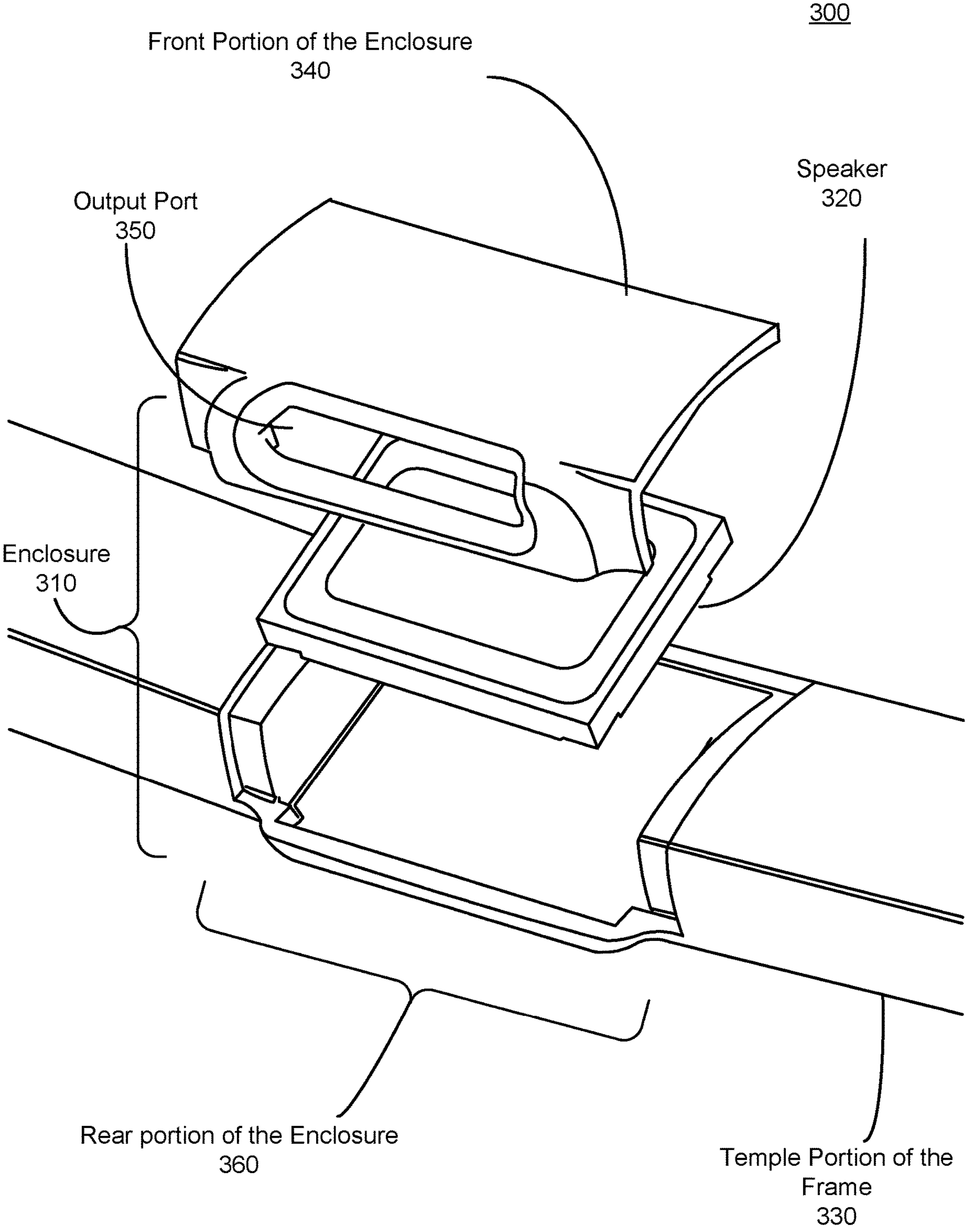
FIG. 3A illustrates an exploded view of an enclosure containing a speaker, in accordance with one or more embodiments.

FIG. 3A illustrates an exploded view 300 of an enclosure 310 containing a speaker 320, in accordance with one or more embodiments. The enclosure 310 and the speaker 320 of FIG. 3A may correspond to an enclosure 240 and speaker 235 of FIG. 2, and/or the enclosure 130 and speaker 110 of FIGS. 1A-1C. In some embodiments, the enclosure 310 is integrated into a temple portion of a frame 330 of the headset (e.g., headset 200). In some embodiments, the enclosure 310 forms a front cavity and a rear cavity that are on opposite sides of the speaker 320. A front portion of the enclosure 310 includes an output port 350 configured to output a first portion of sound emitted from the speaker 320 from the front cavity. A rear portion of the enclosure 360 defines a volume behind the speaker 320 (e.g., on an exterior side of the speaker), corresponding to a rear cavity. In some embodiments, such as that discussed above in relation to FIGS. 1A-1C, the rear cavity may contain acoustic metamaterials forming a series of narrow channels (e.g., channels having width <=10 mm, not shown in FIG. 3A) that serve to virtually increase a volume of the rear cavity, and/or attenuate unwanted high-frequency resonances.

In some embodiments, the rear portion of the enclosure 360 is a part of the frame of the headset, such that the temple portion of the frame 330 and the rear portion of the enclosure 360 form one continuous body. In other embodiments, the front portion of the enclosure 340 is a part of the frame of the headset. In the example shown in FIG. 3A, the front portion of the enclosure 340, including the output port 350, is a separate part that can be separated from and reattached to the rear portion of the enclosure 360. In alternate embodiments, the rear portion of the enclosure 360 and the front portion of the enclosure 340 are distinct components that can be separated from each other and reattached. In some embodiments, the enclosure 310 includes a same material that is used to form the temple portion of the frame 330. In other embodiments, the enclosure 310 includes a different material than is used to form the temple portion of the frame 330.

The speaker 320 may be contained by the enclosure 310 integrated into the temple portion of the frame 330, in a way that is optimal for the space and size constraints of the frame. The shape of a speaker in the audio system may be configured to optimize the audio performance of the audio system, for the size and space constraints of the frame of the headset.

The speaker 320 is contained by the enclosure 310 and positioned in a space between the rear portion of the enclosure 360 and the front portion of the enclosure 340. The enclosure 310 forms the rear cavity and the front cavity, with the speaker 320 separating the rear cavity from the front cavity. The output port 350 is coupled to the front cavity. The enclosure 310 may include additional components than shown in FIGS. 3A, such as ports for electrical components and wiring, for example. In other embodiments, the audio system, including the enclosure 310, and the frame of the headset have different configurations. For example, in some embodiments, the rear portion of the enclosure 360 may define a plurality of channel (e.g., as discussed above), where the channels may extend straight outward in a direction orthogonal to a plane of the membrane of the speaker 320, have one or more bends such that at least a portion of the channels extend in a direction along a length of the frame, be wound to form a coil, e.g., wrapping around the speaker, or some combination thereof.

Figure 3B:
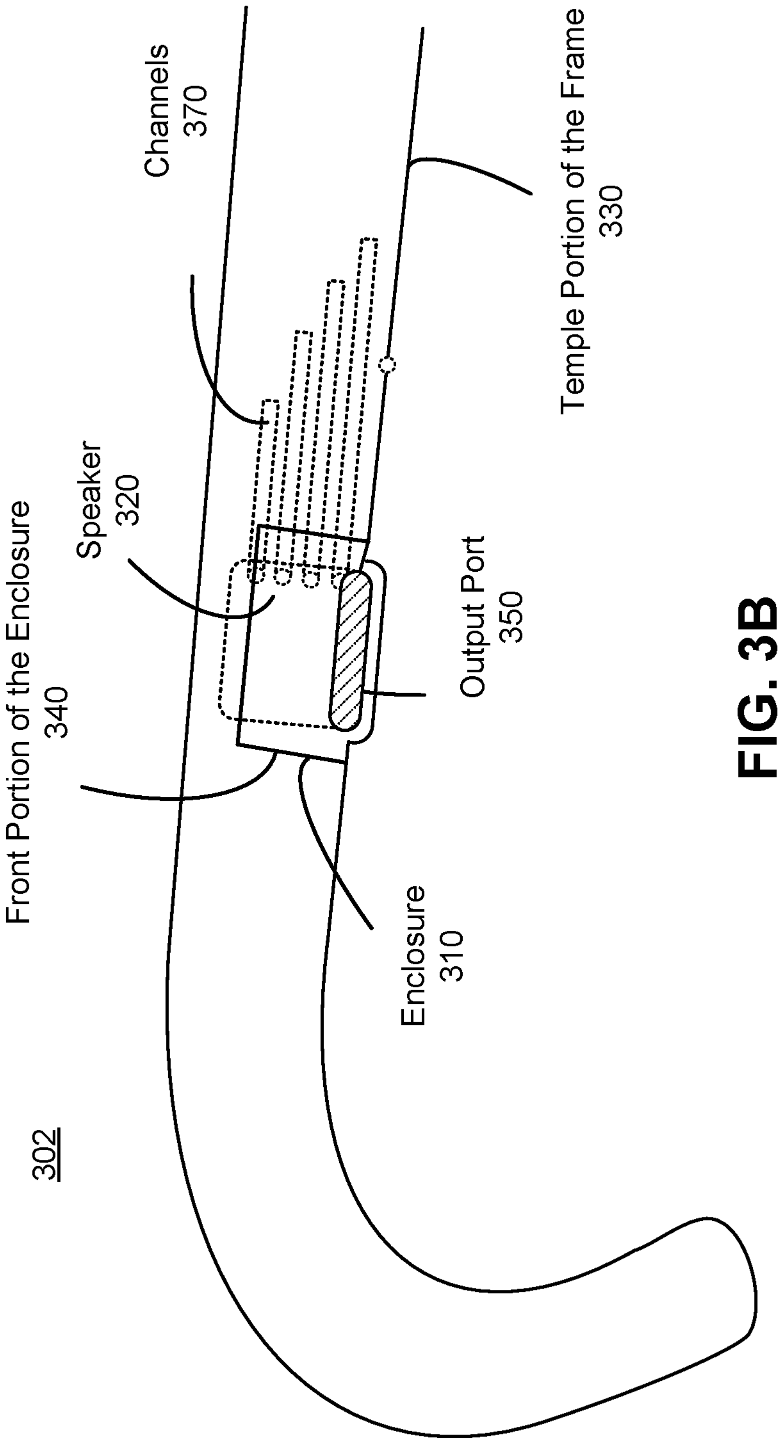
FIG. 3B shows a view of an embodiment of the enclosure integrated into the temple portion of the frame of the headset, in accordance with one or more embodiments.

FIG. 3B shows a view 302 of another embodiment of the enclosure 310 shown in FIG. 3A, where the enclosure is integrated into the temple portion of the frame 330 of the headset. The view 302 corresponds to a view facing the front portion of the enclosure 340 and the output port 350. The front portion of the enclosure 340, including the output port 350, may correspond to a direction facing the ear of the user. In other embodiments, an output port 350 may be positioned in different locations or have a different shape than shown in FIG. 3B. The output port 350 may be configured to direct at least a portion of the sound emitted by the speaker 340 towards an ear of a user wearing the headset, in some embodiments.

The enclosure 310 may have a small form factor (e.g. a total volume of the enclosure may be less than 5 cc) so as to be more easily integrated into, e.g., artificial reality headsets, than enclosures for audio systems with a larger size. In some embodiments, a geometry of the acoustic metamaterial of the rear cavity (e.g., one or more channels) may be shaped based on the form factor of the enclosure 310. For example, although FIGS. 1A-1C illustrate the plurality of channels of the rear cavity extending straight outwards from a back side of the speaker, it is understood that in other embodiments, the channels may be shaped and or oriented differently. For example, in some embodiments, such as that shown in FIG. 3B, the channels 370 of the rear cavity may include one or more bends or changes in direction, e.g., where one or more of the channels 370 extend outward from a back side of the speaker 320, and then bend so that a remaining length of each channel extends in a direction aligned with the length of the temple portion of the frame 330.

In other embodiments, one or more of the channels 370 may be curved or coiled. For example, in some embodiments, one or more of the channels may be formed in a shape of a coil, e.g., coiled around a periphery of the speaker or the transducer, or to form a spiral shape. In some embodiments, one or more of the channels are arranged to have openings facing the transducer of the speaker, with subsequent bends to form a coil in a plane parallel to a plane of the transducer of the speaker, reducing the dimensions of the audio assembly in a direction orthogonal to the membrane compared to if the channels were instead formed to extend straight back away from the transducer.

Figure 3C:
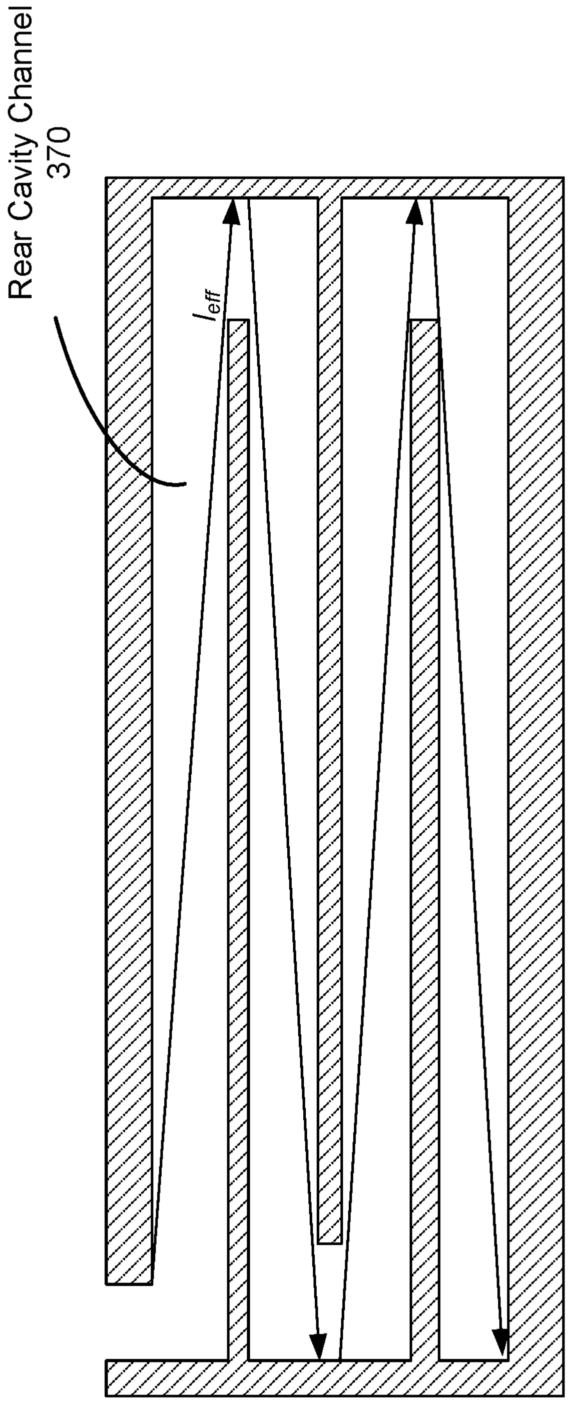
FIG. 3C illustrates a view of a channel of a back cavity of an audio assembly formed in a winding pattern, in accordance with some embodiments.

FIG. 3C illustrates a view of a channel of a back cavity of an audio assembly formed in a winding pattern, in accordance with some embodiments. In some embodiments, the dimensions of the channels are selected to have an effective length ($l_{eff}$) to serve as a quarter-wavelength resonator for a desired frequency. The effective length of a channel may be based upon a shape of the channel. For example, in a straight channel (e.g., as shown in FIG. 1C), the effective length may correspond to the length or depth of the channel. On the other hand, in a winding channel, such as that illustrated in FIG. 3C, the effective length may be based on the length and width of the channel, corresponding to a length of a path that may be taken by a sound wave traveling through the channel. In some embodiments, the rear portion of the enclosure is formed so that the interior of the channels include reflective surfaces, so that the channels may function as Fabry-Perot resonators.

As shown in FIG. 3C, by forming the channel in a winding pattern, the coil may be formed to have a longer effective length $l_{eff}$ without significantly increasing the dimensions of the audio assembly in the direction orthogonal to the plane of the transducer. However, in order to accommodate the channel windings, a dimension of the audio assembly along a plane parallel to that of the transducer may be increased. In some embodiments, the shape in which the channels are formed is selected based upon a form factor of a frame on which the audio assembly is formed on or attached (e.g., the temple portion of the frame).

Virtual Volume Increase and Attenuating Resonances Using Rear Cavity Channels

As discussed above in relation to FIGS. 1A-1C, in some embodiments, the rear cavity defined by the enclosure may be formed into a plurality of channels. In some embodiments, the thermal effects introduced by the narrow cross-sections of the channels at low frequencies serves to increase the effective compressibility of the rear cavity, effectively reducing an amount of stiffness introduced to the transducer, thus increasing the compliance of the transducer. In some embodiments, the acoustic compliance and the impedance of the rear cavity may be expressed using Equations (1) and (2) below:

$$C_{ab} = VC_{eq} \tag{1}$$

$$Z_{ab} = \frac{1}{j\omega C_{ab}} \tag{2}$$

where $C_{ab}$ corresponds to an acoustic compliance of the rear cavity, $C_{eq}$ corresponds to an equivalent compressibility of air within the rear cavity, V corresponds to a volume of the rear cavity, and $Z_{ab}$ corresponds to an impedance of the rear cavity for a given frequency (e.g., corresponding to angular frequency ω).

When considering the thermal viscous effect introduced by the plurality of channels, the equivalent compressibility of air within the rear cavity $C_{eq}$ is greater than the non-viscous compressibility of air, resulting in a larger compliance $C_{ab}$ and a smaller impedance $Z_{ab}$, allowing for larger displacement of the speaker membrane and louder sound. The effect of the channels on the equivalent compressibility $C_{eq}$ is based on the cross-section of the channels. For example, in some embodiments, the equivalent compressibility $C_{eq}$ is characterized by Equation (3) below (e.g., an expanded Taylor series):

$$C_{eq} = \frac{1}{P_o}\left\{1 - \frac{4i\omega(\gamma-1)}{\nu' a^2 w^2} \times \sum_{k=0}^{\infty}\sum_{n=0}^{\infty}\left[\alpha_k^2\beta_n^2\left(\alpha_k^2 + \beta_n^2 + \frac{i\omega\gamma}{\nu'}\right)\right]^{-1}\right\} \tag{3}$$

where a and w correspond to the cross-sectional dimensions of the channels (e.g., length and width), $a_k=(k+½)\pi/a$ and $\beta_k=(k+½)\pi/w$ are constants based on the channel dimensions a and w, v' is a function of air viscosity, thermal conductivity, and specific heat at constant volume, $P_0$ represents air pressure, and $\gamma$ represents ratio of specific heat. In other words, the equivalent compressibility $C_{eq}$ is increased as the cross-sectional dimensions of the channels decreases, due to the thermal viscous effect of air within the channels, translating to higher larger compliance $C_{ab}$ and lower impedance $Z_{ab}$.

Figure 4A:
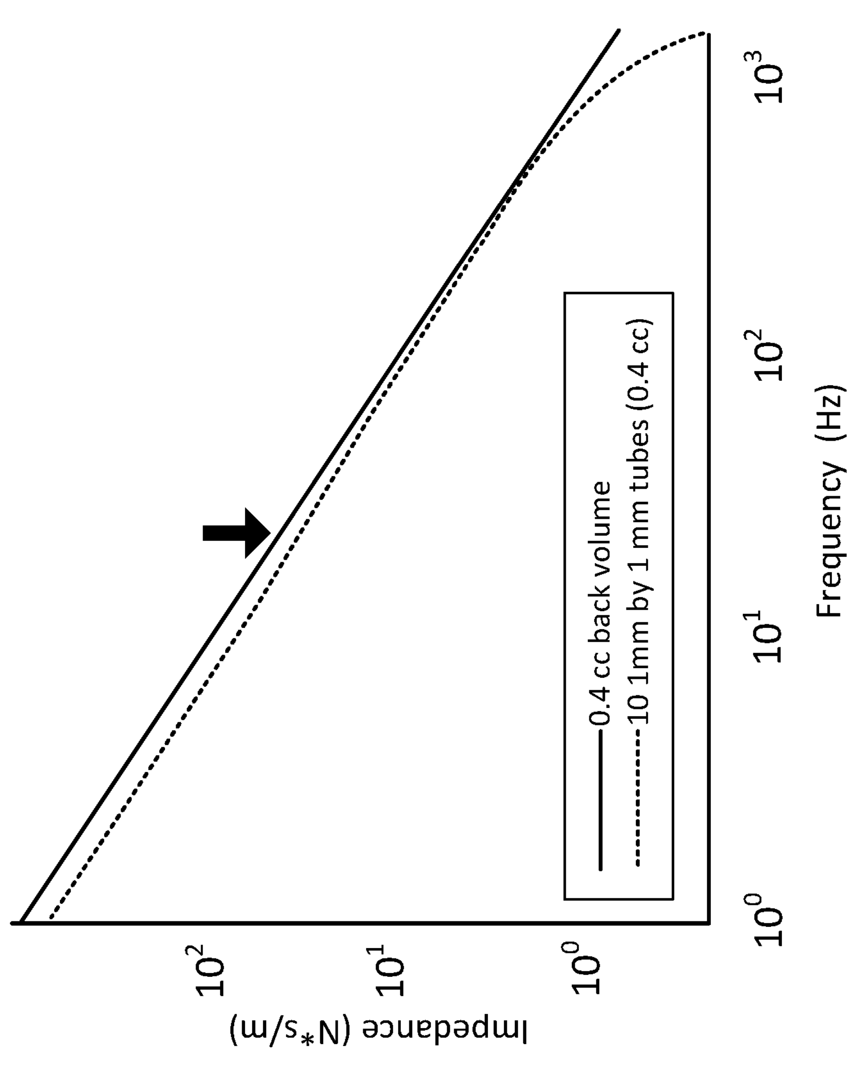
FIG. 4A illustrates a graph showing a comparison between the effective impedance of a conventional closed back speaker and a speaker where the rear cavity is formed into a plurality of channels having an equivalent physical volume, in accordance with some embodiments.

By structuring the rear cavity of the audio assembly to include a plurality of narrow channels, the rear cavity of the speaker is virtually increased for low frequency audio (e.g., a bass portion of the audio), relative to a conventional closed back speaker, e.g., by increasing the effective compressibility of the rear cavity at low frequencies, which increases the compliance of the transducer. For example, FIG. 4A illustrates a graph showing a comparison between the effective impedance of a conventional closed back speaker and a speaker where the rear cavity is formed into a plurality of channels (e.g., ten 1 mm×1 mm channels) having an equivalent physical volume (e.g., 0.4 cc), in accordance with some embodiments. As illustrated in FIG. 4A, when the rear cavity is implemented as a plurality of channels, the impedance of the rear cavity of the speaker is lower at low frequencies, compared to closed back speaker with equivalent rear cavity volume. As shown in Equation (2), the lower impedance corresponds to increased compliance of the back volume. The increased compliance of the back volume allows for higher displacement of the transducer, allowing for increased audio output by the speaker.

Figure 4B:
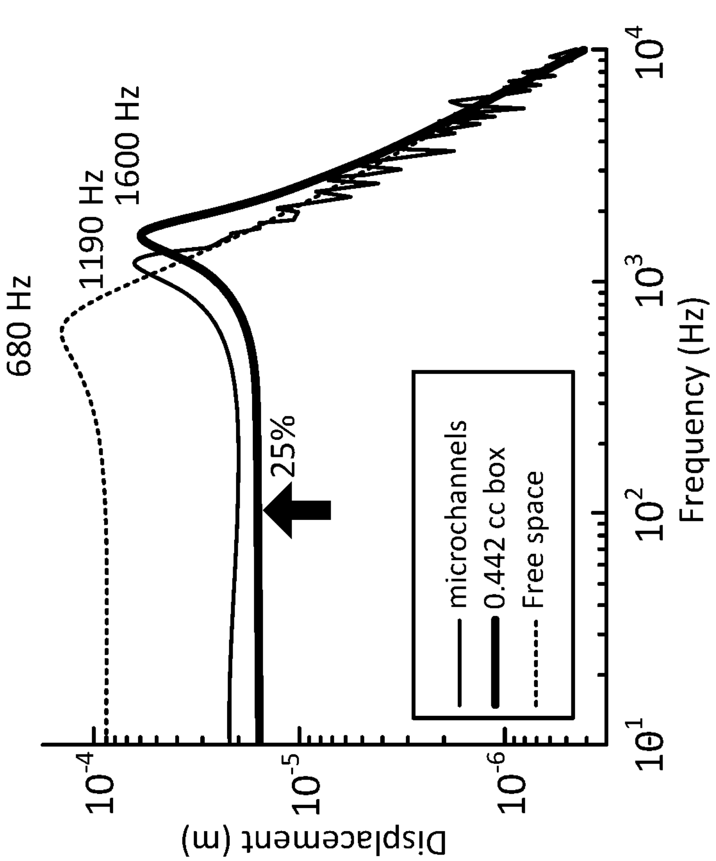
FIG. 4B illustrates graphs showing the characteristics of the speaker membrane displacement under the same constant voltage actuation, when generating audio content of different frequencies, where the rear cavity corresponds to that of a conventional closed back speaker, compared to a plurality of channels with the same total volume, in accordance with some embodiments.

FIG. 4B illustrates graphs showing the characteristics of the speaker membrane displacement under the same constant voltage actuation, when generating audio content of different frequencies, where the rear cavity corresponds to that of a conventional closed back speaker, compared to a plurality of channels with the same total volume, in accordance with some embodiments. For example, as shown in FIG. 4B, the amount of displacement of the membrane, which is affected by the compliance of the rear cavity (e.g., higher compliance allows for higher displacement), is greater when the rear cavity of the speaker is formed into a plurality of channels in comparison to a closed box of equivalent value, particularly for lower frequencies (e.g., <~1000 Hz), allowing the audio system to generate sounds at a higher sound volume with the same or less electrical power input, and amplifying a bass portion of the sound.

Figure 4C:
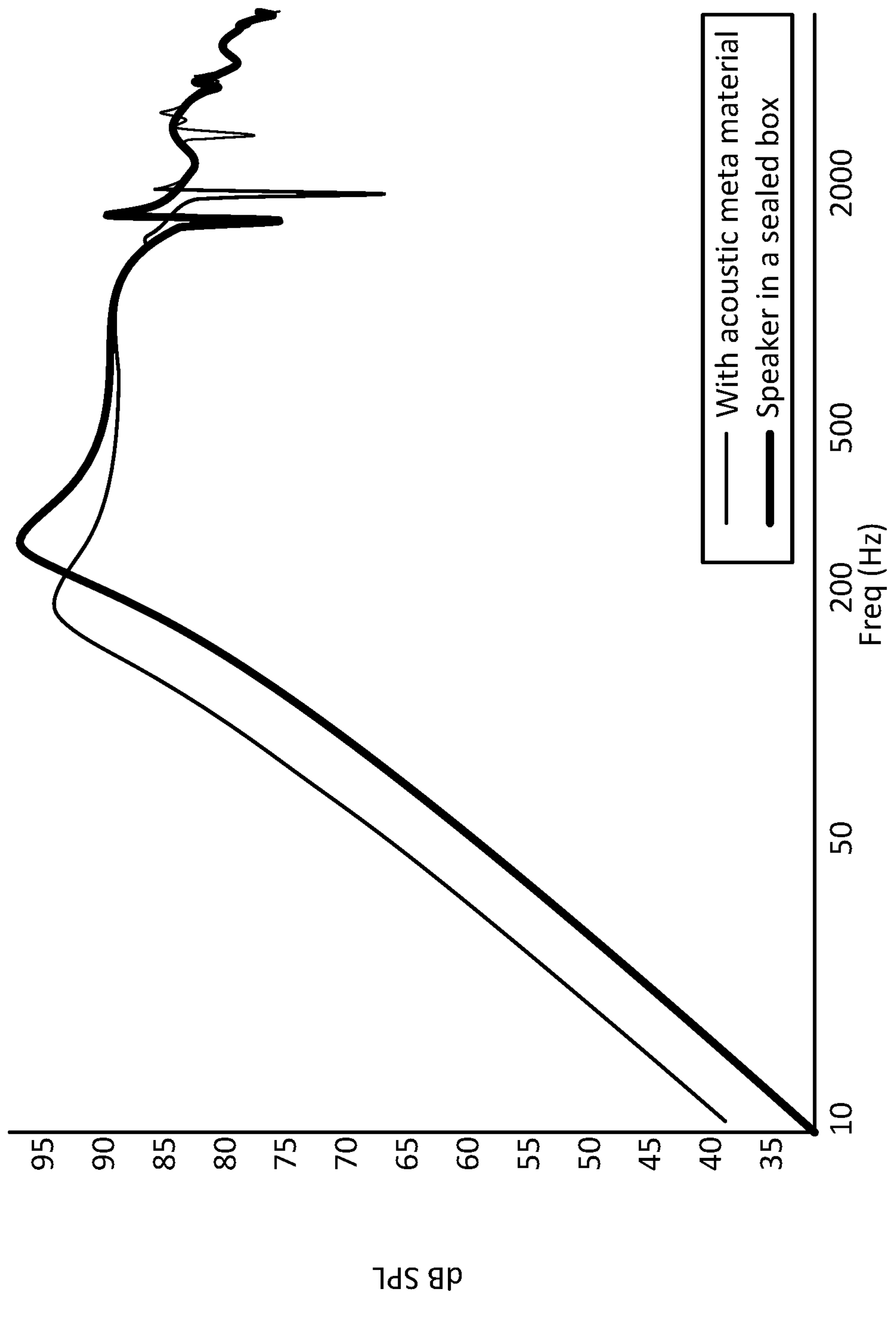
FIG. 4C shows a comparison of a conventional speaker with a virtually-enhanced back-volume speaker utilizing audio metamaterials, in accordance with some embodiments.

FIG. 4C shows an example comparison of a conventional speaker (e.g., where the rear cavity is in the form of a closed box) in free field with a virtually-enhanced back-volume speaker utilizing audio metamaterials (e.g., where the rear cavity is formed into a plurality of channels), in accordance with some embodiments. For example, FIG. 4C shows a 8 to 10 dB SPL (Sound Pressure Level) improvement in bass for the speaker utilizing a rear cavity with channels compared to a conventional closed box, due to the improved compliance of the speaker.

In some embodiments, acoustic metamaterials may be used as an absorption material for attenuating unwanted resonances. In some embodiments, speakers in tiny cavities tend to develop some unwanted resonances above the resonant frequency of the speaker, e.g., in the range of 1 kHz to 6 kHz (separate from the speaker resonance, which is usually in the range of 50 Hz to 2000 Hz). These unwanted resonances will introduce harsh sound and distortions. By utilizing the thermal viscous effect from these tubes, these unwanted resonances can be attenuated. For example, in some embodiments, the acoustic impedance of the metamaterial is tunable by tuning the resonances of the resonators it's composed of (quarter-wavelength resonators, for example), where if the impedance of the metamaterial is matched to the impedance of a medium on the other side of the interface (e.g., other side of the membrane) by carefully designing the effective width and length of the resonant structures, sound will be absorbed at the interface. In some embodiments, a broadband absorber may be obtained by coupling resonators with different resonances. For example, as discussed above, the acoustic material of the back cavity may form an array of channels, where each channel corresponds to a quarter-wavelength resonator for specific frequencies. By selecting a number and length of the channels of the array to cover a range of different frequencies and to match an impedance over such frequency range of a medium in front of the speaker from which sound transmits, absorption of sound waves over different frequencies can be achieved.

For example, in some embodiments, an absorption coefficient (A) representing how much sound energy is absorbed by the metamaterial may be determined as a function the impedance of the surrounding air or surrounding acoustic material ($Z_0$) and an impedance of the metamaterial ($Z_{meta}$), such as that given in Equation (4):

$$A = 1 - \left| \frac{\frac{Z_{meta}}{Z_0} - 1}{\frac{Z_{meta}}{Z_0} + 1} \right|^2 \tag{4}$$

where the metamaterial impedance $Z_{meta}$ is based on the number and dimensions of the channels in the array (see Equation (5), where each channel has an impedance $Z_i$, which may be determined as a function of the total number of channels, a filling ratio of the channels (e.g., a ratio indicating an amount of the back cavity occupied by the metamaterial), a measure of thermal viscosity, and an effective length of the channel.

$$Z_{meta} = \left( \sum_i Z_i^{-1} \right)^{-1} \tag{5}$$

Figure 5:
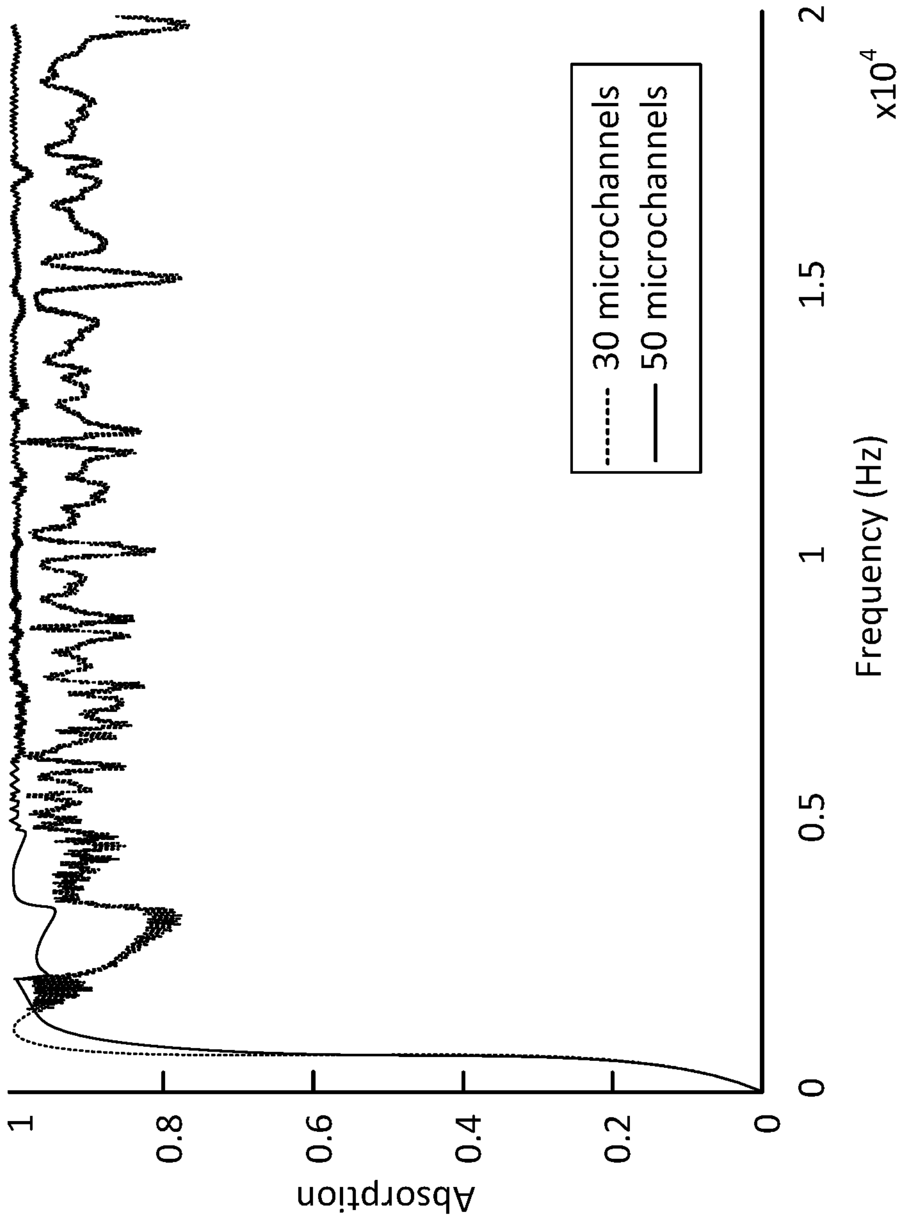
FIG. 5 illustrates a graph showing absorption of high frequency signals for rear cavities with different numbers of channels, in accordance with some embodiments.

In some embodiments, the channels of the acoustic metamaterial are selected such that the metamaterial impedance $Z_{meta}$ matches that of the surrounding air $Z_0$, to achieve total absorption of high frequencies (e.g., A=1), to prevent or reduce high-frequency resonances caused by finite-sized rear cavities. FIG. 5 illustrates a graph showing absorption of high frequency signals for rear cavities with different numbers of channels, in accordance with some embodiments. For example, FIG. 5 illustrates absorption when using a first rear cavity having 30 microchannels, and a second rear cavity having 50 microchannels, where the channels in both cases have the same effective lengths and same total volume. As such, each channel of the 30 microchannels has a larger cross-section in comparison to each of the 50 microchannels. As shown in FIG. 5, with an increased number of smaller channels, the thermal viscous effect of the channels is more prominent, resulting in improved absorption of high frequency signals.

In some embodiments, the metamaterial may be implemented as one or more open-ended tubes, to increase an effective density of the transmission medium, hence increasing the effective mass. In some embodiments, the effective density for different audio frequencies may be adjusted by varying the dimensions of the channel.

Figure 6:
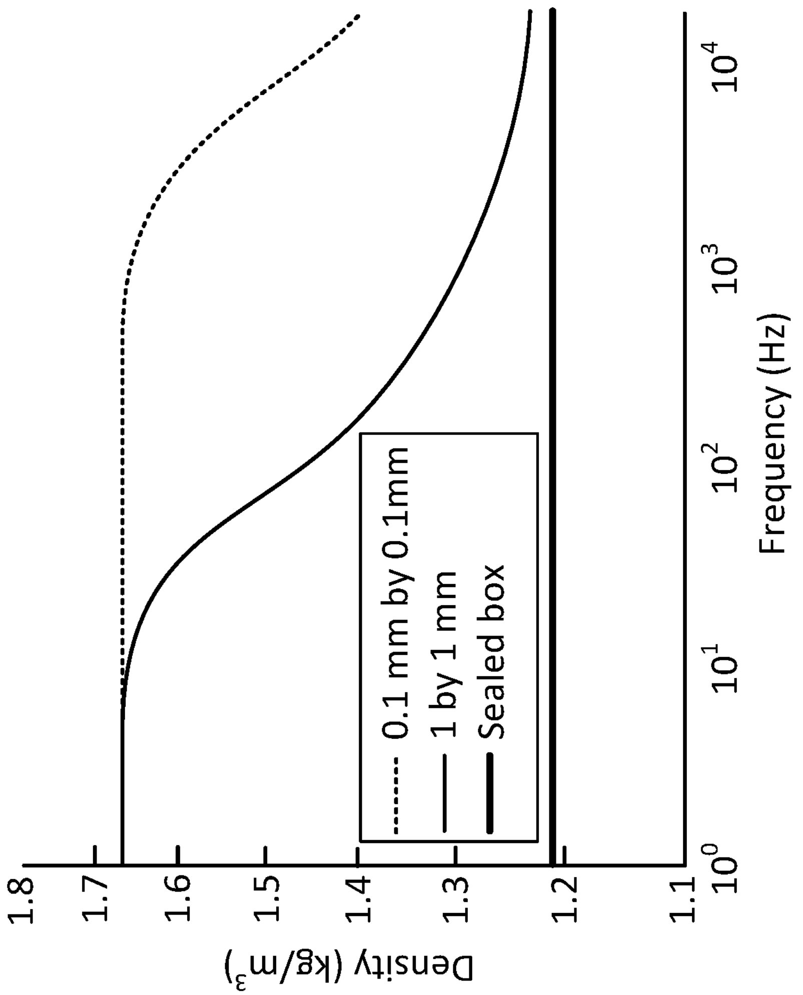
FIG. 6 illustrates a graph showing density of air for different audio frequencies exhibited by metamaterials composed of channels with different cross sections, in accordance with some embodiments.

FIG. 6 illustrates a graph showing density of air for different audio frequencies exhibited by metamaterials composed of channels with different cross sections, in accordance with some embodiments. For example, as shown in FIG. 6, in embodiments where the back volume of the speaker is implemented as one or more open-ended tubes, the effective density may be based on a size of the tube, where a tube having a narrower cross-section (e.g., 0.1 mm by 0.1 mm) exhibits higher density for higher frequencies compared to a tube having a larger cross-section (e.g., 1 mm by 1 mm). As discussed above in relation to Equations (1)-(3), channels having smaller cross sections result in a higher compressibility for low frequencies, resulting in larger compliance and higher output for low frequencies when driven by the same voltage.

As such, as described above, in some embodiments, the rear cavity of a speaker may be implemented as a plurality of channels in order to "virtually" increase a volume of the rear cavity (e.g., by increasing compliance, decreasing impedance), attenuate high frequency resonances, and/or increase effective density, where the number and depths of the channels are selected based on one or more desired resonance frequencies and to achieve a desired impedance value. For example, in some embodiments, the channels of the rear cavity are formed to virtual increase the volume of the rear cavity for low frequency audio (e.g., a bass portion of the audio), while also serving as broadband absorber for high frequencies.

In some embodiments, for a given fixed rear cavity volume, the number, length, and cross-sections of the channels may be selected to exhibit certain desired characteristics. For example, as discussed above, the thermal viscous effect of the channels is based on the cross-sections of the channels, while the lengths of the channels may be selected to attenuate desired resonance frequencies. If total volume and channel cross-section are fixed, then the total length of the channels may be bounded, where choice of number and length of channels may be based on the resonant frequency of the speaker and desired frequencies to attenuate, as well as ease of fabrication and cost.

Additional Acoustic Metamaterial Applications

In some embodiments, audio metamaterials may be used as part of the duct/porting/horn of a speaker, to increase a broadband sound pressure level output and make the speaker more efficient.

Figure 7B:
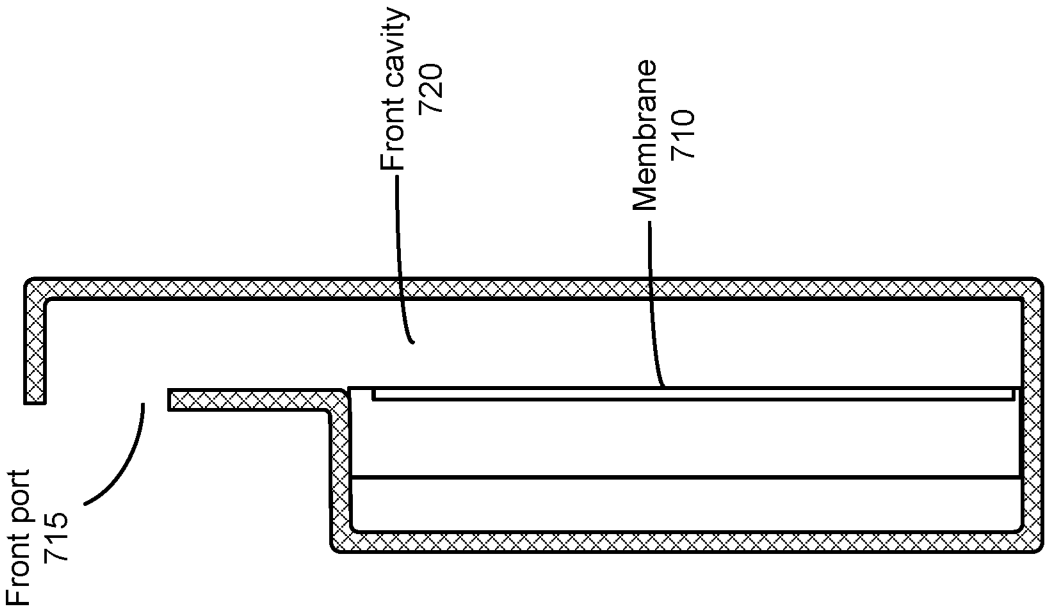
FIG. 7B illustrates a view of a speaker having a front cavity that may be used to accommodate an acoustic metamaterial horn, in accordance with some embodiments.
Figure 7A:
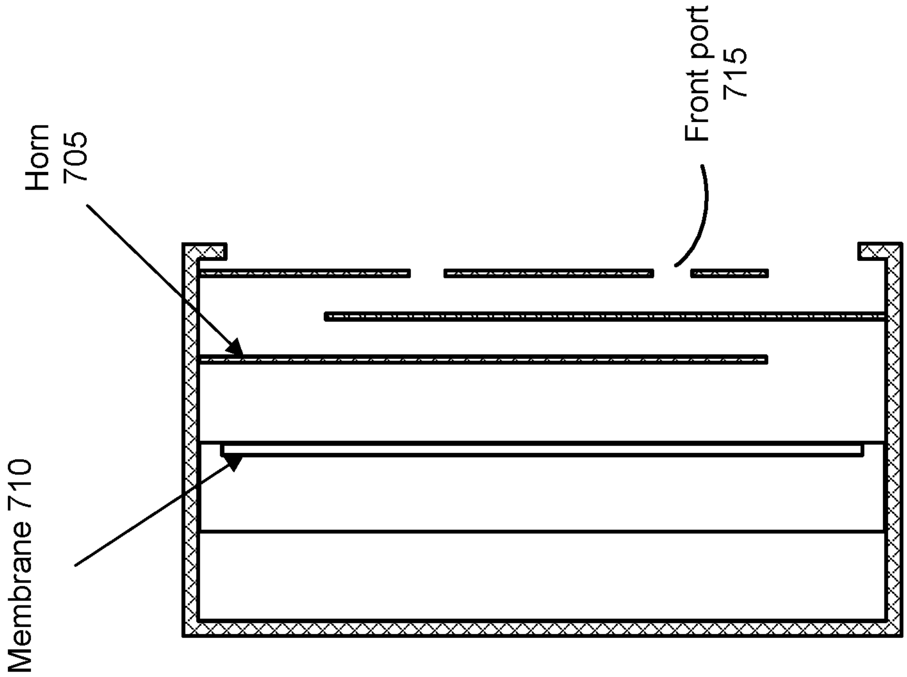
FIG. 7A illustrates a view of a speaker having a horn, in accordance with some embodiments.

FIG. 7A illustrates a view of a speaker having a horn, in accordance with some embodiments. The horn 705 couples an output interface of the speaker (e.g., membrane 710) to a front port 715, functioning as a waveguide. Compared to a conventional horn, the use of the metamaterial horn facilitates impedance matching with the metamaterial of the rear cavity, while providing a more compact form factor to save on space, facilitating the use of the speaker in headsets, wearable devices, and/or other applications requiring a small form factor. In some embodiments, where the overall size of the speaker front cavity may to constrained based on a form factor of the audio assembly, acoustic metamaterials may be used in the existing space of the front cavity to alter the audio characteristics of the front cavity, such as for impedance matching purposes). For example, FIG. 7B illustrates a view of a speaker having a front cavity that may be used to accommodate an acoustic metamaterial horn. The volume of the front cavity 720 may be utilized to form an acoustic metamaterial horn (not shown) for impedance matching with the rear cavity of the speaker.

Figure 8:
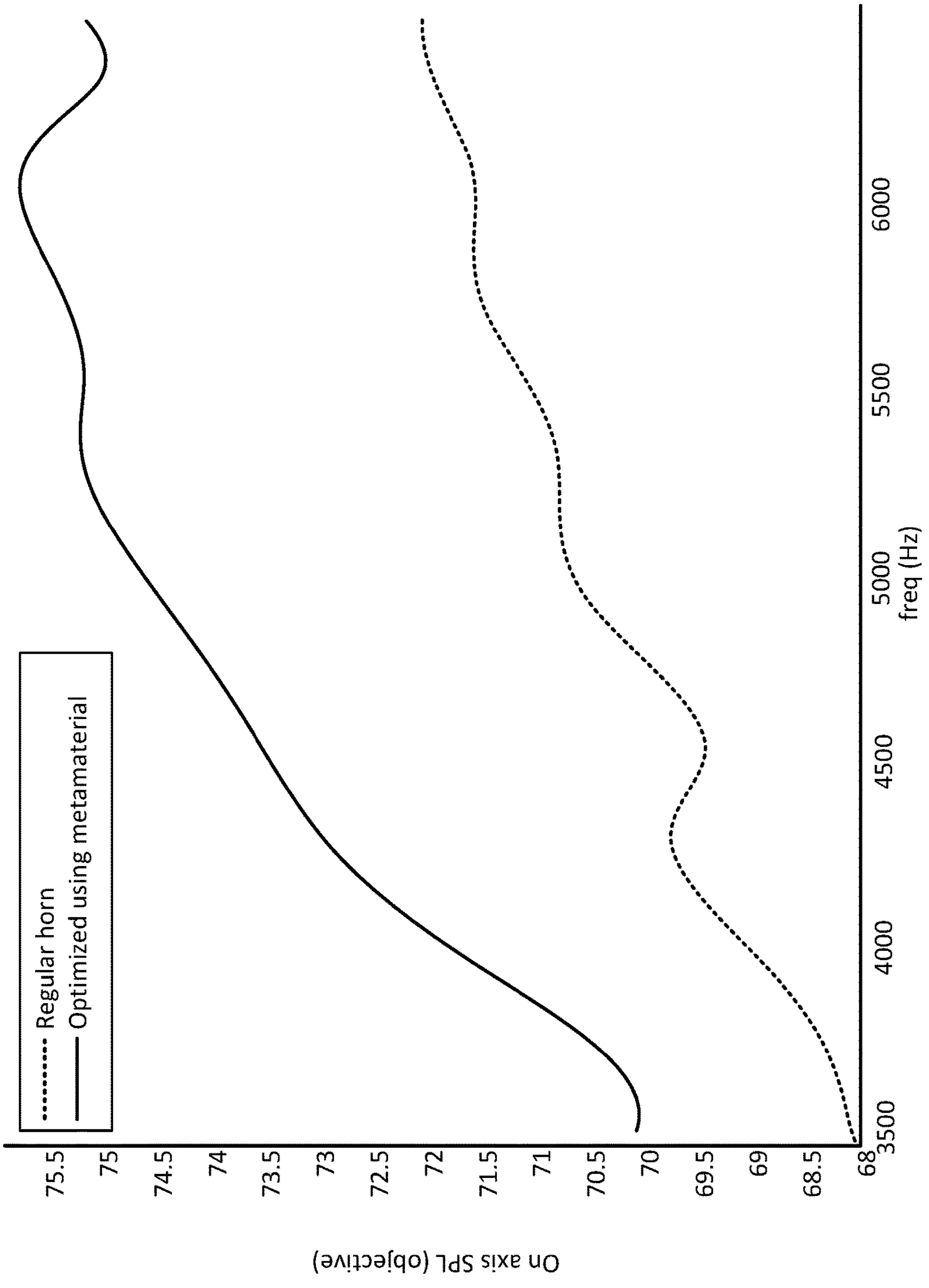
FIG. 8 shows on-axis frequency-dependent sound pressure level (SPL) for a conventional or regular horn versus an audio metamaterials replacement, in accordance with some embodiments.

FIG. 8 shows on-axis frequency-dependent sound pressure level (SPL) for a conventional or regular horn versus an audio metamaterials replacement, in accordance with some embodiments. As shown in FIG. 8, the use of a horn with acoustic metamaterials may result in a broadband increase in sound pressure level for all frequencies shown.

In some embodiments, audio metamaterials may be used to attenuate and/or isolate vibration to avoid vibration contamination. This may be useful in isolating speakers coupled to a frame of a headset to mitigate vibrations caused by the speakers from being transmitted to the frame. In some embodiments, audio metamaterials may be used to isolate the vibration of a loudspeaker embedded on a head-worn device and to prevent contamination of the signal picked up by other sensors such as IMU, cameras, microphones, MEMS actuators, etc.

In some embodiments, the acoustic metamaterials may be used to form an acoustic diode. An acoustic diode is a one-way acoustic transmission device, and in some embodiments, be configured to attenuate noise and mitigate the occlusion effect. Occlusion effect occurs when one's ear-canal is blocked using an in-ear device (e.g., hearing aid or a hearable device). In such cases, the acoustic metamaterials may be used to create a one-way valve, letting the low-frequency occlusion sound to escape from the ear-canal, and avoiding the environmental sound or noises to get into the ear-canal. For example, in some embodiments, occlusion problems happens mostly below 1 kHz, and the acoustic feedback issues happen in above 1 kHz. By using this metamaterial acoustic diode, the noise, the occlusion, and the acoustic feedback issue may be mitigated all at once.

In some embodiments an audio device may include a structure with or without additional sound sources to break the reciprocity to form a one-way broad-band sound transmission valve (acoustic diode), which will attenuate the background noise but not introduce occlusion effect to the user. With careful design on tuning the frequency range, the leaked-out sound shall not contaminate the external microphone on the hearing device to cause feedback problems. In some embodiments, an in-ear device may be configured to fit at least partially within and occlude an ear canal of a user. The in-ear device includes acoustic metamaterial configured to transmit sound (e.g., low frequency sound, e.g., self-generated sounds like vocalization, chewing, etc.) from within the ear canal to a local area outside of the ear canal, and block sound from passing from the local area through the in-ear device into the ear canal.

In some embodiments, acoustic metamaterials are engineered to serve in different audio/media devices to enhance the audio quality and reduce the total power consumption of these device. Power consumption is reduced or improved, because the user can get passive sound amplification using these devices. For example, in an audio device comprising a transducer and a passive amplifier, the transducer is configured to generate sound, while the passive amplifier is composed of a plurality of shapes that together form an acoustic metamaterial, where the acoustic metamaterial is configured to amplify a bass portion of the sound (typically below 1 kHz) to form audio content that is presented to a user.

Note that in some cases sound is generated by a speaker, and the sound is then provided via an acoustic waveguide to a port from which the sound exits the acoustic waveguide. In some instances, the acoustic waveguide can impart resonances and/or anti-resonances at various frequencies in the audible band (20 Hz to 20 kHz). In some embodiments, acoustic metamaterials may be used to correct for and/or prevent the resonances and/or anti-resonances from occurring in the sound exiting the port.

Likewise, in some embodiments, it can be useful to have a converging acoustic wave to help direct the acoustic wave towards a particular target location (e.g., to a user's ear canal). Acoustic metamaterials may be used to modify the acoustic waves in such a manner.

Example System Environment

Figure 9:
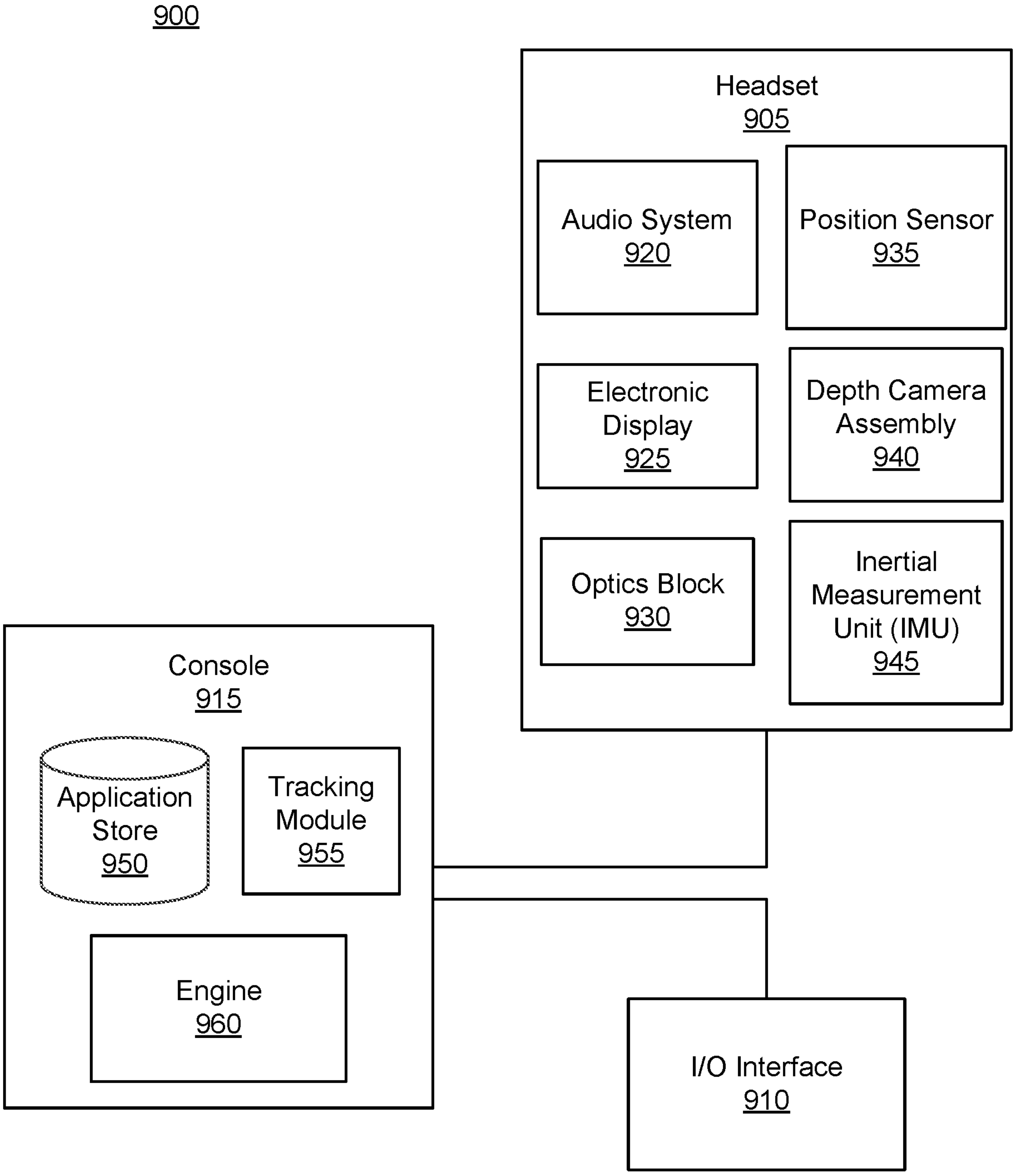
FIG. 9 is an example system environment of a headset including an audio system, in accordance with one or more embodiments.

FIG. 9 is an example system environment of a headset including an audio system, in accordance with one or more embodiments. The system 900 may operate in an artificial reality environment. The system 900 shown in FIG. 9 includes a headset 905 and an input/output (I/O) interface 910 that is coupled to a console 915. The headset 905 may be an embodiment of the headset 100. While FIG. 9 shows an example system 900 including one headset 905 and one I/O interface 910, in other embodiments any number of these components may be included in the system 900. For example, there may be multiple headsets 905 each having an associated I/O interface 910 with each headset 905 and I/O interface 910 communicating with the console 915. In alternative configurations, different and/or additional components may be included in the system 900. Additionally, functionality described in conjunction with one or more of the components shown in FIG. 9 may be distributed among the components in a different manner than described in conjunction with FIG. 9 in some embodiments. For example, some or all of the functionality of the console 915 is provided by the headset 905.

In some embodiments, the headset 905 may correct or enhance the vision of a user, protect the eye of a user, or provide images to a user. The headset 905 may be eyeglasses which correct for defects in a user's eyesight. The headset 905 may be sunglasses which protect a user's eye from the sun. The headset 905 may be safety glasses which protect a user's eye from impact. The headset 905 may be a night vision device or infrared goggles to enhance a user's vision at night. Alternatively, the headset 905 may not include lenses and may be just a frame with an audio system 920 that provides audio (e.g., music, radio, podcasts) to a user.

In some embodiments, the headset 905 may be a head-mounted display that presents content to a user comprising augmented views of a physical, real-world environment with computer-generated elements (e.g., two dimensional (2D) or three dimensional (3D) images, 2D or 3D video, sound, etc.). In some embodiments, the presented content includes audio that is presented via an audio system 920 that receives audio information from the headset 905, the console 915, or both, and presents audio data based on the audio information. In some embodiments, the headset 905 presents virtual content to the user that is based in part on a real environment surrounding the user. For example, virtual content may be presented to a user of the eyewear device. The user physically may be in a room, and virtual walls and a virtual floor of the room are rendered as part of the virtual content. In the embodiment of FIG. 9, the headset 905 includes an audio system 920, an electronic display 925, an optics block 930, a position sensor 935, a depth camera assembly (DCA) 940, and an inertial measurement (IMU) unit 945. Some embodiments of the headset 905 have different components than those described in conjunction with FIG. 9. Additionally, the functionality provided by various components described in conjunction with FIG. 9 may be distributed differently among the components of the headset 905 in other embodiments or be captured in separate assemblies remote from the headset 905.

The audio system 920 includes one or more audio assemblies and an audio controller. For example, the audio system may include one or more audio assemblies coupled to a left side of a frame of the headset 905 and one or more audio assemblies coupled to a right side of the frame of the headset 905. Each audio assembly includes one or more speakers configured to emit sounds. Each audio assembly may also include at least some of an enclosure containing one of the one or more speakers. In some embodiments, the enclosure contains a plurality of speakers. In some embodiments, the remaining portion of the enclosure is part of the frame of the headset 905. In other embodiments the audio assembly include all of the enclosure, and the whole enclosure couples to the frame of the headset 905.

The audio assembly may be an embodiment of the audio assembly including the speakers 235 and some of each of the enclosures 240. As described above with regard to FIG. 2A, the enclosure of the audio assembly may form a front cavity having an output port and a rear cavity formed with an acoustic metamaterial, with the speaker separating the front cavity from the rear cavity. The acoustic metamaterial of the rear cavity may form a plurality of channels configured to virtually increase an effective volume of the rear cavity, attenuate one or more resonance frequencies, or some combination thereof. The audio system 920 includes an audio controller that may generate instructions for the speaker assembly to emit audio content. Note that in some embodiments, some or all of the audio controller is part of the console 915.

The electronic display 925 displays 2D or 3D images to the user in accordance with data received from the console 915. In various embodiments, the electronic display 925 comprises a single electronic display or multiple electronic displays (e.g., a display for each eye of a user). Examples of the electronic display 925 include: a liquid crystal display (LCD), an organic light emitting diode (OLED) display, an active-matrix organic light-emitting diode display (AMOLED), some other display, or some combination thereof.

The optics block 930 magnifies image light received from the electronic display 925, corrects optical errors associated with the image light, and presents the corrected image light to a user of the headset 905. The electronic display 925 and the optics block 930 may be an embodiment of the display element 110. In various embodiments, the optics block 930 includes one or more optical elements. Example optical elements included in the optics block 930 include: an aperture, a Fresnel lens, a convex lens, a concave lens, a filter, a reflecting surface, or any other suitable optical element that affects image light. Moreover, the optics block 930 may include combinations of different optical elements. In some embodiments, one or more of the optical elements in the optics block 930 may have one or more coatings, such as partially reflective or anti-reflective coatings.

Magnification and focusing of the image light by the optics block 930 allows the electronic display 925 to be physically smaller, weigh less, and consume less power than larger displays. Additionally, magnification may increase the field of view of the content presented by the electronic display 925. For example, the field of view of the displayed content is such that the displayed content is presented using almost all (e.g., approximately 110 degrees diagonal), and in some cases, all of the user's field of view. Additionally, in some embodiments, the amount of magnification may be adjusted by adding or removing optical elements.

In some embodiments, the optics block 930 may be designed to correct one or more types of optical error. Examples of optical error include barrel or pincushion distortion, longitudinal chromatic aberrations, or transverse chromatic aberrations. Other types of optical errors may further include spherical aberrations, chromatic aberrations, or errors due to the lens field curvature, astigmatisms, or any other type of optical error. In some embodiments, content provided to the electronic display 925 for display is pre-distorted, and the optics block 630 corrects the distortion when it receives image light from the electronic display 925 generated based on the content.

The DCA 940 captures data describing depth information for a local area surrounding the headset 905. In one embodiment, the DCA 940 may include a structured light projector, an imaging device, and a controller. The imaging device may be an embodiment of the imaging device 120. The structured light projector may be an embodiment of the illuminator 125. The captured data may be images captured by the imaging device of structured light projected onto the local area by the structured light projector. In one embodiment, the DCA 940 may include two or more cameras that are oriented to capture portions of the local area in stereo and a controller. The captured data may be images captured by the two or more cameras of the local area in stereo. The controller computes the depth information of the local area using the captured data. Based on the depth information, the controller determines absolute positional information of the headset 905 within the local area. The DCA 940 may be integrated with the headset 905 or may be positioned within the local area external to the headset 905.

The IMU 945 is an electronic device that generates data indicating a position of the headset 905 based on measurement signals received from one or more position sensors 935. The one or more position sensors 935 may be an embodiment of the position sensor 115. A position sensor 935 generates one or more measurement signals in response to motion of the headset 905. Examples of position sensors 935 include: one or more accelerometers, one or more gyroscopes, one or more magnetometers, another suitable type of sensor that detects motion, a type of sensor used for error correction of the IMU 945, or some combination thereof. The position sensors 935 may be located external to the IMU 945, internal to the IMU 945, or some combination thereof.

Based on the one or more measurement signals from one or more position sensors 935, the IMU 945 generates data indicating an estimated current position of the headset 905 relative to an initial position of the headset 905. For example, the position sensors 935 include multiple accelerometers to measure translational motion (forward/back, up/down, left/right) and multiple gyroscopes to measure rotational motion (e.g., pitch, yaw, and roll). In some embodiments, the IMU 945 rapidly samples the measurement signals and calculates the estimated current position of the headset 905 from the sampled data. For example, the IMU 945 integrates the measurement signals received from the accelerometers over time to estimate a velocity vector and integrates the velocity vector over time to determine an estimated current position of a reference point on the headset 905. Alternatively, the IMU 945 provides the sampled measurement signals to the console 915, which interprets the data to reduce error. The reference point is a point that may be used to describe the position of the headset 905. The reference point may generally be defined as a point in space or a position related to the eyewear device's 905 orientation and position.

The IMU 945 receives one or more parameters from the console 915. As further discussed below, the one or more parameters are used to maintain tracking of the headset 905. Based on a received parameter, the IMU 945 may adjust one or more IMU parameters (e.g., sample rate). In some embodiments, data from the DCA 940 causes the IMU 945 to update an initial position of the reference point so it corresponds to a next position of the reference point. Updating the initial position of the reference point as the next calibrated position of the reference point helps reduce accumulated error associated with the current position estimated the IMU 945. The accumulated error, also referred to as drift error, causes the estimated position of the reference point to "drift" away from the actual position of the reference point over time. In some embodiments of the headset 905, the IMU 945 may be a dedicated hardware component. In other embodiments, the IMU 945 may be a software component implemented in one or more processors.

The I/O interface 910 is a device that allows a user to send action requests and receive responses from the console 915. An action request is a request to perform a particular action. For example, an action request may be an instruction to start or end capture of image or video data, start or end the audio system 920 from producing sounds, start or end a calibration process of the headset 905, or an instruction to perform a particular action within an application. The I/O interface 910 may include one or more input devices. Example input devices include: a keyboard, a mouse, a game controller, or any other suitable device for receiving action requests and communicating the action requests to the console 915. An action request received by the I/O interface 910 is communicated to the console 915, which performs an action corresponding to the action request. In some embodiments, the I/O interface 915 includes an IMU 945, as further described above, that captures calibration data indicating an estimated position of the I/O interface 910 relative to an initial position of the I/O interface 910. In some embodiments, the I/O interface 910 may provide haptic feedback to the user in accordance with instructions received from the console 915. For example, haptic feedback is provided when an action request is received, or the console 915 communicates instructions to the I/O interface 910 causing the I/O interface 910 to generate haptic feedback when the console 915 performs an action.

The console 915 provides content to the headset 905 for processing in accordance with information received from one or more of: the headset 905 and the I/O interface 910. In the example shown in FIG. 9, the console 915 includes an application store 950, a tracking module 955, and an engine 960. Some embodiments of the console 915 have different modules or components than those described in conjunction with FIG. 9. Similarly, the functions further described below may be distributed among components of the console 915 in a different manner than described in conjunction with FIG. 9.

The application store 950 stores one or more applications for execution by the console 915. An application is a group of instructions, that when executed by a processor, generates content for presentation to the user. Content generated by an application may be in response to inputs received from the user via movement of the headset 905 or the I/O interface 910. Examples of applications include: gaming applications, conferencing applications, video playback applications, calibration processes, or other suitable applications.

The tracking module 955 calibrates the system environment 900 using one or more calibration parameters and may adjust one or more calibration parameters to reduce error in determination of the position of the headset 905 or of the I/O interface 910. Calibration performed by the tracking module 955 also accounts for information received from the IMU 945 in the headset 905 and/or an IMU 945 included in the I/O interface 910. Additionally, if tracking of the headset 905 is lost, the tracking module 955 may re-calibrate some or all of the system environment 900.

The tracking module 955 tracks movements of the headset 905 or of the I/O interface 910 using information from the one or more sensor devices 935, the IMU 945, or some combination thereof. For example, the tracking module 955 determines a position of a reference point of the headset 905 in a mapping of a local area based on information from the headset 905. The tracking module 955 may also determine positions of the reference point of the headset 905 or a reference point of the I/O interface 910 using data indicating a position of the headset 905 from the IMU 945 or using data indicating a position of the I/O interface 910 from an IMU 945 included in the I/O interface 910, respectively. Additionally, in some embodiments, the tracking module 955 may use portions of data indicating a position or the headset 905 from the IMU 945 to predict a future location of the headset 905. The tracking module 955 provides the estimated or predicted future position of the headset 905 or the I/O interface 910 to the engine 960.

The engine 960 also executes applications within the system environment 900 and receives position information, acceleration information, velocity information, predicted future positions, audio information, or some combination thereof of the headset 905 from the tracking module 955. Based on the received information, the engine 960 determines content to provide to the headset 905 for presentation to the user. For example, if the received information indicates that the user has looked to the left, the engine 960 generates content for the headset 605 that mirrors the user's movement in a virtual environment or in an environment augmenting the local area with additional content. Additionally, the engine 960 performs an action within an application executing on the console 915 in response to an action request received from the I/O interface 910 and provides feedback to the user that the action was performed. The provided feedback may be visual or audible feedback via the headset 905 or haptic feedback via the I/O interface 910.

Additional Configuration Information

The foregoing description of the embodiments has been presented for illustration; it is not intended to be exhaustive or to limit the patent rights to the precise forms disclosed. Persons skilled in the relevant art can appreciate that many modifications and variations are possible considering the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. An audio device comprising:

a transducer configured to emit sound; and an enclosure containing the transducer and forming a front volume and a rear volume on opposite sides of the transducer, wherein the enclosure includes:

an output port configured to output audio from the front volume that is generated by the transducer;

a plurality of closed channels formed within the rear volume, and the plurality of closed channels together forming an acoustic metamaterial configured to virtually increase the rear volume, to amplify a bass portion of the sound to form audio content, wherein:

the plurality of closed channels are configured to attenuate one or more selected resonance frequencies, at least in part due to the plurality of closed channels being dimensioned to provide impedance matching between the rear volume and the front volume over the one or more selected resonance frequencies; and the audio content is presented to a user.

2. The audio device of claim 1, wherein the plurality of closed channels have depths selected to attenuate the one or more selected resonance frequencies.

3. The audio device of claim 2, wherein the plurality of closed channels include one or more channels having a depth corresponding to a quarter wave resonator for a frequency of the one or more selected resonance frequencies.

4. The audio device of claim 1, wherein an equivalent acoustic volume (Vas) of the audio device is greater than a volume of the front and rear volumes.

5. The audio device of claim 1, the plurality of closed channels comprise channels of a plurality of different depths.

6. The audio device of claim 1, wherein the plurality of closed channels include one or more straight channels that extend in a direction orthogonal to a surface area of the transducer.

7. The audio device of claim 1, wherein the plurality of closed channels include one or more channels having at least one bend.

8. The audio device of claim 1, wherein the plurality of closed channels include one or more channels coiled around the transducer.

9. The audio device of claim 1, wherein at least a portion of the plurality of closed channels is formed within a frame of a headset.

10. A headset comprising:

a frame; and an audio system comprising:

a transducer configured to emit sound; and an enclosure containing the transducer and forming a front volume and a rear volume on opposite sides of the transducer, wherein the enclosure includes:

an output port configured to output audio from the front volume that is generated by the transducer;

a plurality of closed channels formed within the rear volume, and the plurality of closed channels together forming an acoustic metamaterial configured to virtually increase the rear volume, to amplify a bass portion of the sound to form audio content, wherein:

the plurality of closed channels are configured to attenuate one or more selected resonance frequencies, at least in part due to the plurality of closed channels being dimensioned to provide impedance matching between the rear volume and the front volume over the one or more selected resonance frequencies; and the audio content is presented to a user.

11. The headset of claim 10, wherein the plurality of closed channels have depths selected to attenuate the one or more selected resonance frequencies.

12. The headset of claim 11, wherein the plurality of closed channels include one or more channels having a depth corresponding to a quarter wave resonator for a frequency of the one or more selected resonance frequencies.

13. The headset of claim 10, wherein an equivalent acoustic volume of the audio system is greater than a volume of the front and rear volumes.

14. The headset of claim 10, the plurality of closed channels comprise channels of a plurality of different depths.

15. The headset of claim 10, wherein the plurality of closed channels include one or more straight channels that extend in a direction orthogonal to a surface area of the transducer.

16. The headset of claim 10, wherein the plurality of closed channels include one or more channels having at least one bend.

17. The headset of claim 10, wherein the plurality of closed channels include one or more channels coiled around the transducer.

18. The headset of claim 10, wherein at least a portion of the plurality of closed channels is formed within the frame.

* * * * *